US012389018B2

(12) United States Patent
Chen et al.

(10) Patent No.: US 12,389,018 B2
(45) Date of Patent: *Aug. 12, 2025

(54) CODING OF TRANSFORM COEFFICIENTS IN VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Xiaoyu Xiu, San Diego, CA (US); Tsung-Chuan Ma, San Diego, CA (US); Xianglin Wang, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,020

(22) Filed: Apr. 29, 2024

(65) Prior Publication Data
US 2024/0283949 A1 Aug. 22, 2024

Related U.S. Application Data

(63) Continuation of application No. 17/468,434, filed on Sep. 7, 2021, now Pat. No. 12,003,737, which is a (Continued)

(51) Int. Cl.
*H04N 19/18* (2014.01)
*H04N 19/119* (2014.01)
(Continued)

(52) U.S. Cl.
CPC .......... *H04N 19/18* (2014.11); *H04N 19/119* (2014.11); *H04N 19/13* (2014.11); *H04N 19/159* (2014.11);
(Continued)

(58) Field of Classification Search
CPC .... H04N 19/119; H04N 19/13; H04N 19/157; H04N 19/159; H04N 19/176;
(Continued)

(56) References Cited

U.S. PATENT DOCUMENTS 12,003,737 B2 * 6/2024 Chen .................... H04N 19/157
2013/0019519 A1 1/2013 Giardino et al.
(Continued)

FOREIGN PATENT DOCUMENTS

CN 104081777 A 10/2014
CN 106105227 A 11/2016
(Continued)

OTHER PUBLICATIONS

Bross et al., "Versatile Video Coding (Draft 4)", Jan. 9-18, 2019, JVET-M1001-v6, pp. 1-298. (Year: 2019).*
(Continued)

*Primary Examiner* — Kathleen M Walsh
(74) *Attorney, Agent, or Firm* — Arch & Lake LLP

(57) ABSTRACT

Methods and devices for video encoding are provided. In the method, the device determines, for a current luma transform block in a coding unit, whether an intra subpartition (ISP) split type is an ISP mode. In response to determining that the intra subpartition split type is not the ISP mode, the device determines a first context index for a Coded Block Flag (CBF) flag of the current luma transform block as being equal to zero or one, where the CBF flag specifies whether the current luma transform block comprises one or more transform coefficient levels not equal to zero. In response to determining that the intra subpartition split type is the ISP mode, the device determines the first context index based on
(Continued)

whether a current transform unit is a first one to be parsed in the coding unit. The device encodes the CBF flag based on the first context index.

20 Claims, 19 Drawing Sheets

Related U.S. Application Data continuation of application No. PCT/US2020/021922, filed on Mar. 10, 2020.

(60) Provisional application No. 62/816,898, filed on Mar. 11, 2019.

(51) Int. Cl.
| | |
|---|---|
| *H04N 19/13* | (2014.01) |
| *H04N 19/159* | (2014.01) |
| *H04N 19/176* | (2014.01) |
| *H04N 19/593* | (2014.01) |
| *H04N 19/70* | (2014.01) |

(52) U.S. Cl.
CPC ......... *H04N 19/176* (2014.11); *H04N 19/593* (2014.11); *H04N 19/70* (2014.11)

(58) Field of Classification Search
CPC .... H04N 19/18; H04N 19/186; H04N 19/593; H04N 19/70; H04N 19/91
USPC .................................................... 375/240.02
See application file for complete search history.

(56) References Cited

U.S. PATENT DOCUMENTS

| | | | |
|---|---|---|---|
| 2014/0092963 | A1 | 4/2014 | Wang |
| 2014/0161195 | A1 | 6/2014 | Karkkäinen et al. |
| 2015/0063460 | A1 | 3/2015 | Gamei et al. |
| 2017/0150185 | A1 | 5/2017 | Sze |
| 2018/0002843 | A1 | 1/2018 | Henin |
| 2018/0205972 | A1 | 7/2018 | Piao et al. |
| 2020/0382810 | A1* | 12/2020 | LeLeannec ............ H04N 19/70 |
| 2021/0352304 | A1 | 11/2021 | Chernyak et al. |
| 2022/0046247 | A1 | 2/2022 | Yoo et al. |
| 2022/0086490 | A1 | 3/2022 | Koo et al. |
| 2024/0283947 | A1* | 8/2024 | Chen ..................... H04N 19/119 |
| 2024/0283948 | A1* | 8/2024 | Chen ..................... H04N 19/176 |

FOREIGN PATENT DOCUMENTS

| | | | |
|---|---|---|---|
| CN | 109429063 | A | 3/2019 |
| CN | 110506420 | A | 11/2019 |
| CN | 114143548 | B | 2/2023 |
| KR | 10-1678577 | B1 | 11/2016 |
| WO | 2017043760 | A1 | 3/2017 |
| WO | 2020185799 | A1 | 9/2020 |

OTHER PUBLICATIONS

Yin Zhao, "CE7-related: Remove transform depth in cbf coding", JVET-O0193-v1, Video Experts Team (JVET) of ITU-T SG 16 WP 3 and ISO/IEC JTC 1/SC 29/WG 11 15th Meeting: Gothenburg, SE, Jul. 3-12, 2019, (4p).
Benjamin Bross, et al., "Versatile Video Coding (Draft 4)", Document: JVET-M1001-v6, Joint Video Experts Team (JVET) of ITU-T SG 16 WP 3 and ISO/IEC JTC 1/SC 29/WG 11 13th Meeting: Marrakech, MA, Jan. 9-18, 2019, (298p).
First Office Opinion Notice issued in Application No. 202311664183.2 dated Aug. 7, 2024, with English translation (16p).
Notice of Grant of Invention Patent Right issue in Application No. CN202311664183.2, dated Oct. 31, 2024, (4p).
Benjamin Bross, et al., "Versatile Video Coding (Draft 3)" Joint Video Experts Team (JVET) of ITU-T SG 16 WP 3 and ISO/IEC JTC 1/SC 29/WG 11, Document: JVET-M1001-v1, 13th Meeting: Marrakech, MA, Jan. 9-18, 2019, (241p).
First Office Opinion Notice issued in Application No. CN202311587059.0 dated Aug. 9, 2024, with English translation (12p).
Search Report issued in Application No. CN202311587059.0 Dated Aug. 7, 2024, (2p).
Benjamin Bross et al., "Versatile Video Coding (Draft 4)", Joint Video Experts Team (JVET) of ITU-T SG 16 WP 3 and ISO/IEC JTC 1/SC 29/WG 11 13th Meeting: Marrakech, MA, Jan. 18-19, 2019, (243p).
The First CNOA and Search Report of Application No. 202310060764.9, dated Nov. 15, 2023 with English translation, (17p).
The Second CNOA of Application No. 202310060764.9, dated Jan. 31, 2024 with English translation, (6p).
Extended European Search Report issued in Application No. 20769160.1 dated Nov. 21, 2022 (7p).
Benjamin Bross, et al., "Versatile Video Coding (Draft 4)", Joint Video Experts Team (JVET) of ITU-T SG 16 WP 3 and ISO/IEC JTC 1/SC 29/WG 11 JVET-M1001-v6, 13th Meeting: Marrakech, MA, Jan. 19-18, 2019, (298p).
Kwai Inc., Yi-Wen Chen, et al., "Non-CE7: Simplification of cbf coding," Joint Video Experts Team (JVET) of ITU-T SG 16 WP 3 and ISO/IEC JTC 1/SC 29/WG 11, JVET-N0326, 14th Meeting: Geneva, CH, Mar. 19-27, 2019, (6p).
International Search Report of International Application No. PCT/US2020/021922 dated Jun. 26, 2020, (2p).
Bross, Benjamin et al., "Versatile Video Coding (Draft 4)", Joint Video Experts Team (JVET) of ITU-T SG 16 WP 3 and ISO/IEC JTC 1/SC 29/WG 11 JVET-M1001-v7, 13th Meeting: Marrakech, MA, (300p).
First CNOA issued in Application No. 20111441127.3 dated Aug. 24, 2022 with English translation, (12p).

* cited by examiner

CODING OF TRANSFORM COEFFICIENTS IN VIDEO CODING

CROSS-REFERENCE TO RELATED APPLICATION

This application is a continuation of U.S. application Ser. No. 17/468,434, filed on Sep. 7, 2021, which is a continuation of PCT Application No. PCT/US2020/021922, filed on Mar. 10, 2020, which claims the benefit of U.S. Provisional Application No. 62/816,898 filed on Mar. 11, 2019, the entire disclosures of which are incorporated herein by reference in their entireties.

FIELD

The present disclosure relates generally to coding (e.g., encoding and decoding) and compressing video data. More specifically, this disclosure relates to methods and apparatus for improving and/or simplifying coding transform coefficients in video coding.

BACKGROUND

This section provides background information related to the present disclosure. The information contained within this section should not necessarily be construed as prior art.

Various video coding techniques may be used to compress video data. Video coding is performed according to one or more video coding standards. For example, video coding standards include versatile video coding (VVC), joint exploration test model coding (JEM), high-efficiency video coding (H.265/HEVC), advanced video coding (H.264/AVC), moving picture experts group coding (MPEG), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements over its predecessor, there is evidence that superior coding efficiency can be achieved with additional coding tools over HEVC. Based on that, both VCEG and MPEG started the exploration work of new coding technologies for future video coding standardization. One Joint Video Exploration Team (JVET) was formed in October 2015 by ITU-T VECG and ISO/IEC MPEG to begin significant study of advanced technologies that could enable substantial enhancement of coding efficiency. The JVET developed a reference software called joint exploration model (JEM) by integrating several additional coding tools on top of the HEVC test model (HM).

In October 2017, ITU-T and ISO/IEC issued a joint call for proposals (CfP) on video compression with capability beyond HEVC. In April 2018, 23 CfP responses were received and evaluated at the 10-th JVET meeting, which demonstrated compression efficiency gain over the HEVC of around 40%. Based on such evaluation results, the JVET launched a new project to develop the new generation video coding standard named Versatile Video Coding (VVC). In the same month, one reference software codebase, called VVC test model (VTM), was established for demonstrating a reference implementation of the VVC standard.

SUMMARY

This section provides a general summary of the disclosure, and is not a comprehensive disclosure of its full scope or all of its features.

According to a first aspect of the present disclosure, a method for coding a coded block flag (CBF) using Context-adaptive binary arithmetic coding (CABAC) includes utilizing a first context model for coding a first CBF of a Cr chroma (Cr) transform unit (tu_cbf_cr); utilizing a second context model for coding a second CBF of a Cb chroma (Cb) transform unit (tu_cbf_cb); and utilizing two context modes for coding a third CBF of a luma transform unit (tu_cbf_luma).

According to a second aspect of the present disclosure, a method for coding a coded block flag (CBF) using Context-adaptive binary arithmetic coding (CABAC) includes utilizing a first context model for coding a first CBF of a luma transform unit (tu_cbf_luma); utilizing a second context model for coding a second CBF of a Cb transform unit (tu_cbf_cb); and utilizing two context modes for coding a third CBF of a Cr transform unit, wherein the two context modes are selected based on a value of the second CBF of the Cb transform unit for a current coding unit (CU).

BRIEF DESCRIPTION OF THE DRAWINGS

Hereinafter, sets of illustrative, non-limiting embodiments of the present disclosure will be described in conjunction with the accompanying drawings. Variations of structure, method, or functionality may be implemented by those of ordinary skill in the relevant art based on the examples presented herein, and such variations are all contained within the scope of the present disclosure. In cases where no conflict is present, the teachings of different embodiments may, but need not, be combined with one another.

DETAILED DESCRIPTION

The terms used in the present disclosure are directed to illustrating particular examples, rather than to limit the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to," depending on the context.

Reference throughout this specification to "one embodiment," "an embodiment," "another embodiment," or the like in the singular or plural means that one or more particular features, structures, or characteristics described in connection with an embodiment are included in at least one embodiment of the present disclosure. Thus, the appearances of the phrases "in one embodiment" or "in an embodiment," "in another embodiment," or the like in the singular or plural in various places throughout this specification are not necessarily all referring to the same embodiment. Furthermore, the particular features, structures, or characteristics in one or more embodiments may be combined in any suitable manner.

The present disclosure relates generally to coding (e.g., encoding and decoding) video data. More specifically, this disclosure relates to methods and apparatus for improving Context-adaptive binary arithmetic coding (CABAC) of a coded block flag (CBF). In various embodiments, the example methods and apparatus may by applied independently or jointly with one or more other example methods and/or apparatus. In conventional methods, context selection for the CABAC coding of CBF flags may not be efficient in VVC. For example, CBF value probability distribution may not be dependent on the transform depth of a given transform block. Moreover, CBF value probability distribution may not be dependent on a block being a regular intra block or an SDIP sub-block. Using different contexts based on those conditions may increase implementation cost and potentially hurt the corresponding probability adaptation.

Figure 1:
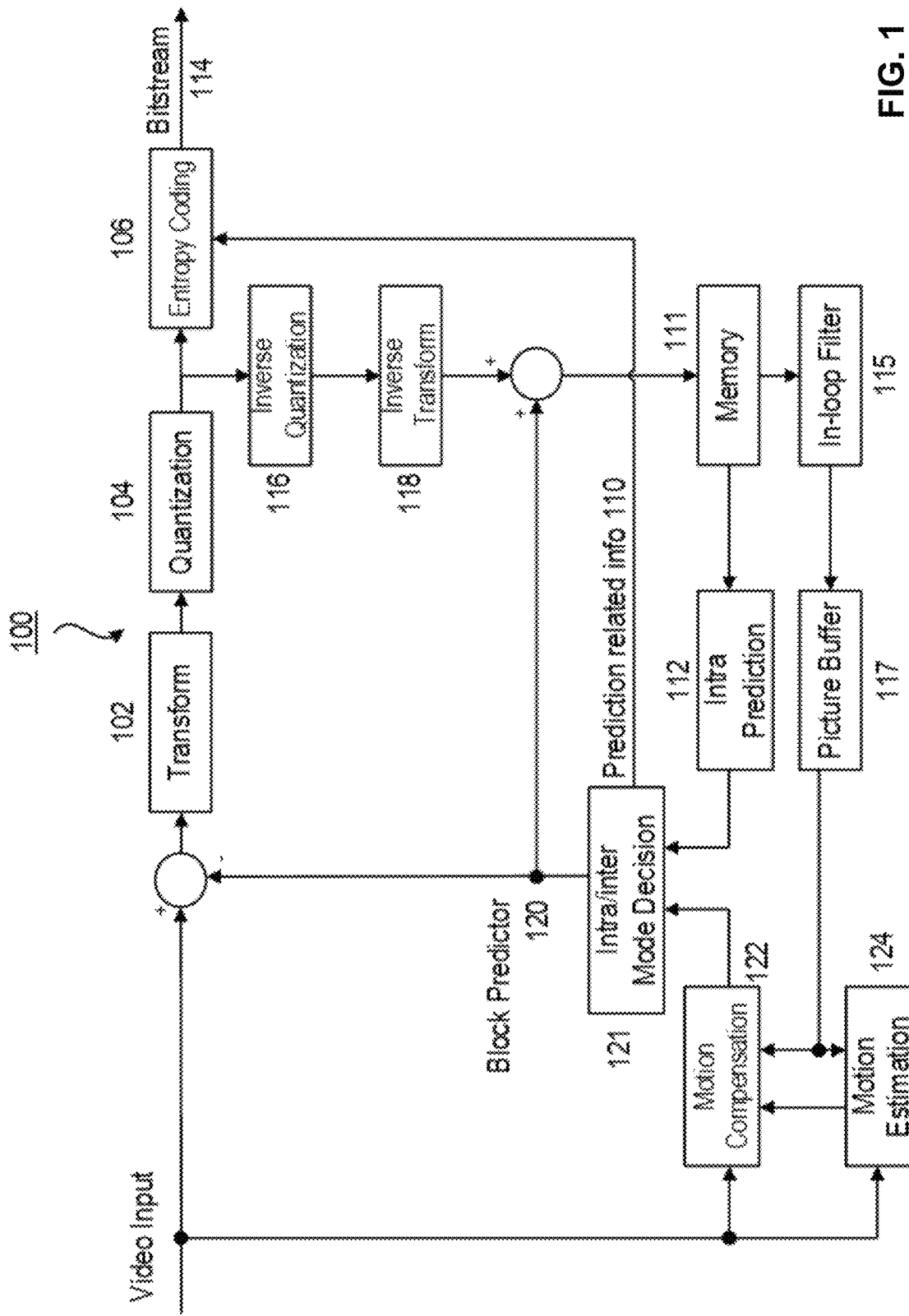
FIG. 1 shows an example block-based hybrid video encoding system according to example embodiments including an example encoder suitable for use with various video coding and decoding techniques, such as Versatile Video Coding (VCC) methods.

FIG. 1 shows an example block-based hybrid video encoding system according to example embodiments including an example encoder 100 suitable for use with various video coding techniques, such as Versatile Video Coding (VCC) methods. Referring to FIG. 1, in encoder 100, a video frame is partitioned into a plurality of video blocks for processing. For each given video block, a prediction is formed based on either an inter-prediction approach or an intra-prediction approach. In inter-prediction, one or more predictors are formed through motion estimation and motion compensation, based on pixels from previously reconstructed frames. In intra-prediction, predictors are formed based on reconstructed pixels in a current frame. Through mode decision, a best predictor may be chosen to predict a current block.

A prediction residual, representing the difference between a current video block and its predictor, is sent to a transform circuitry 102. The term "circuitry" as used herein includes hardware and software to operate the hardware. Transform circuitry 102 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. Transform circuitry 102 applies the transform to the residual block, producing a block of transform coefficients. The transform may convert the residual information from a pixel domain to a transform domain, such as a frequency domain.

The resulting transform coefficients are then sent from transform circuitry 102 to a quantization circuitry 104 for entropy reduction. Quantization circuitry 104 quantizes the transform coefficients to further reduce bit rate. The quantization process may reduce the bit depth associated with some or all of the coefficients. The degree of quantization may be modified by adjusting a quantization parameter. Quantized coefficients are then fed to an entropy coding circuitry 106 to generate a compressed video bitstream. Entropy coding circuitry 106 entropy codes the quantized transform coefficients. For example, entropy coding circuitry 106 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. With context-based entropy coding, context may be based on neighboring blocks. Following the entropy coding by entropy coding circuitry 106, the encoded bitstream may be transmitted to another device (e.g., a video decoder) or archived for later transmission or retrieval. As shown in FIG. 1, prediction-related information 110 from an inter-prediction circuitry and/or an intra-prediction circuitry 112, such as video block partition information, motion vectors, a reference picture index, and an intra-prediction mode, are also fed through entropy coding circuitry 106 and saved into a compressed video bitstream 114.

In encoder 100, decoder-related circuitry is also needed in order to reconstruct pixels for the purpose of prediction. First, a prediction residual is reconstructed through an inverse quantization circuitry 116 and an inverse transform circuitry 118. This reconstructed prediction residual is combined with a block predictor 120 to generate un-filtered reconstructed pixels for a current video block. Inverse quantization block 116 and inverse transform circuitry 118 apply inverse quantization and inverse transformation, respectively, to reconstruct the residual block in the pixel domain. In certain embodiments, a summer adds the reconstructed residual block to the motion compensated prediction block earlier produced by a motion compensation circuitry 122 or intra-prediction circuitry 112 to produce a reconstructed video block for storage in a reference picture memory 111. The reconstructed video block may be used by a motion estimation circuitry 124 and motion compensation circuitry 122 as a reference block to inter-code a block in a subsequent video frame.

To improve coding efficiency and visual quality, an in-loop filter 115 is used. For example, a deblocking filter is available in AVC and HEVC, as well as the current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated for incorporation in the final standard. These in-loop filter operations are optional. Performing these operations helps to improve coding efficiency and visual quality. The operations may also be turned off as a decision rendered by encoder 100 to save computational complexity. It should be noted that intra-prediction is usually based on unfiltered reconstructed pixels, while inter-prediction is based on filtered reconstructed pixels if these filter options are turned on by encoder 100.

Figure 2:
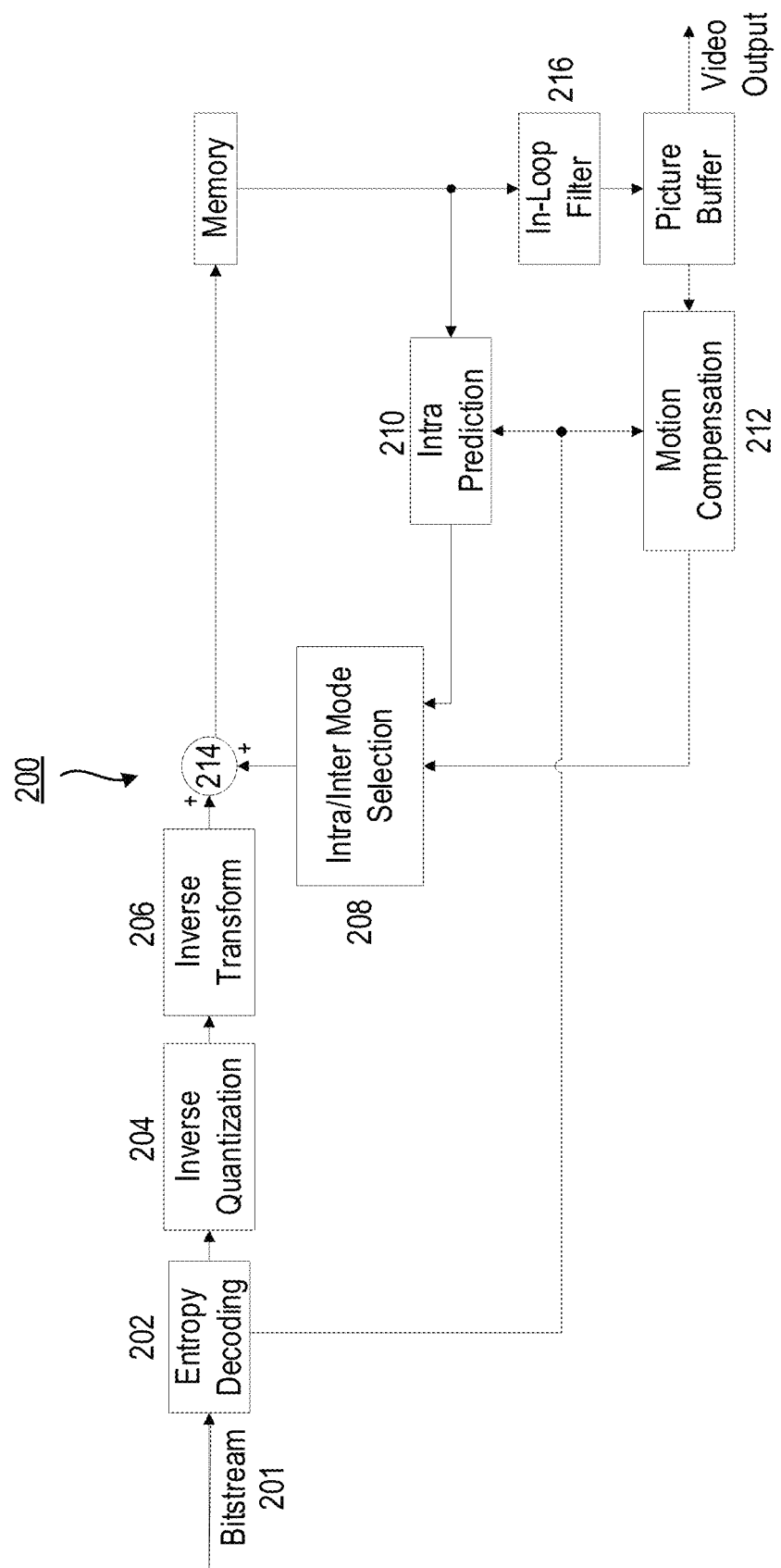
FIG. 2 shows an example decoder according to example embodiments suitable for use with various video coding and decoding techniques, such as Versatile Video Coding (VCC) methods.

FIG. 2 shows an example decoder 200 according to example embodiments suitable for use with various video coding techniques, such as Versatile Video Coding (VCC) methods. In example embodiments, decoder 200 is similar to the reconstruction-related section residing in encoder 100 of FIG. 1. Referring to FIG. 2, in decoder 200 an incoming video bitstream 201 is first decoded through an entropy decoding circuitry 202 to derive quantized coefficient levels and prediction-related information. The quantized coefficient levels are then processed through an inverse quantization circuitry 204 and an inverse transform circuitry 206 to obtain a reconstructed prediction residual. Inverse quantization circuitry 204 inverse quantizes, i.e., de-quantizes, the quantized transform coefficients provided in the bitstream and decoded by entropy decoding circuitry 202. The inverse quantization process may include use of a quantization parameter QPy calculated by decoder 200 for each video block in the video slice to determine a degree of quantization and, likewise, a degree of inverse quantization that should be applied. Inverse transform circuitry 206 applies an inverse transform. e.g., an inverse DCT, an inverse integer transform, or a conceptually similar inverse transform process, to the transform coefficients in order to produce residual blocks in the pixel domain.

A block predictor mechanism, which may be implemented in an intra/inter mode selector circuitry 208, includes an intra-prediction circuitry 210 is configured to perform an intra-prediction process and/or a motion compensation circuitry 212 configured to perform a motion compensation process based on decoded prediction information. A set of unfiltered reconstructed pixels are obtained by summing the reconstructed prediction residual from inverse transform circuitry 206 and a predictive output generated by the block predictor mechanism, using a summer 214. In situations where an in-loop filter 216 is turned on, a filtering operation is performed on these reconstructed pixels to derive the final reconstructed video for output.

When the video slice is coded as an intra-coded (I) slice, intra-prediction circuitry 210 may generate prediction data for a video block of the current video slice based on a signaled intra-prediction mode and data from previously decoded blocks of the current frame or picture. When the video frame is coded as an inter-coded (i.e., B, P or GPB) slice, motion compensation circuitry 212 produces predictive blocks for a video block of the current video slice based on the motion vectors and other syntax elements received from entropy decoding circuitry 202. The predictive blocks may be produced from one of the reference pictures within one of the reference picture lists. Decoder 200 may construct the reference frame lists, e.g., List 0 and List 1, using default construction techniques based on reference pictures stored in the reference picture memory.

Motion compensation circuitry 212 determines prediction information for a video block of the current video slice by parsing the motion vectors and other syntax elements and uses the prediction information to produce the predictive blocks for the current video block being decoded. For example, motion compensation circuitry 212 uses some of the received syntax elements to determine a prediction mode (e.g., intra-prediction or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation circuitry 212 may also perform interpolation based on interpolation filters for sub-pixel precision. Motion compensation circuitry 212 may use interpolation filters as used by encoder 100 during encoding of the video blocks to calculate interpolated values for sub-integer pixels of reference blocks. In example embodiments, motion compensation circuitry 212 determines the interpolation filters used by encoder 100 from the received syntax elements and uses the interpolation filters to produce predictive blocks. Motion compensation circuitry 212 may be configured to perform any or all of the methods described in this disclosure (alone or in any combination).

Referring again to FIG. 1, spatial prediction and/or temporal prediction may be performed. Spatial prediction (or "intra-prediction") uses pixels from the samples of already coded neighboring blocks (which are called reference samples) in the same video picture or slice to predict the current video block. Spatial prediction reduces spatial redundancy inherent in the video signal. Temporal prediction (also referred to as "inter-prediction" or "motion compensated prediction") uses reconstructed pixels from the already coded video pictures to predict the current video block. Temporal prediction reduces temporal redundancy inherent in the video signal. A temporal prediction signal for a given CU is usually signaled by one or more motion vectors (MVs) which indicate an amount and a direction of motion between the current CU and the current CU's temporal reference. Also, if multiple reference pictures are supported, one reference picture index is additionally sent, which is used to identify from which reference picture in the reference picture store the temporal prediction signal comes. After spatial and/or temporal prediction, the intra/inter mode decision block 121 in the encoder 100 chooses the best prediction mode, for example based on the rate-distortion optimization method. The prediction block is then subtracted from the current video block and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, using a deblocking filter, such as a sample adaptive offset (SAO) and adaptive in-loop filter (ALF) for example, may be applied to the reconstructed CU before the reconstructed CU is placed in the reference picture buffer 117 and used to code future video blocks. To form the output video bitstream, a coding mode (inter or intra), prediction mode information, motion information, and quantized residual coefficients are all sent to entropy coding circuitry 106 to be further compressed and packed to form the bit-stream.

Figures 3A, 3B, 3C:
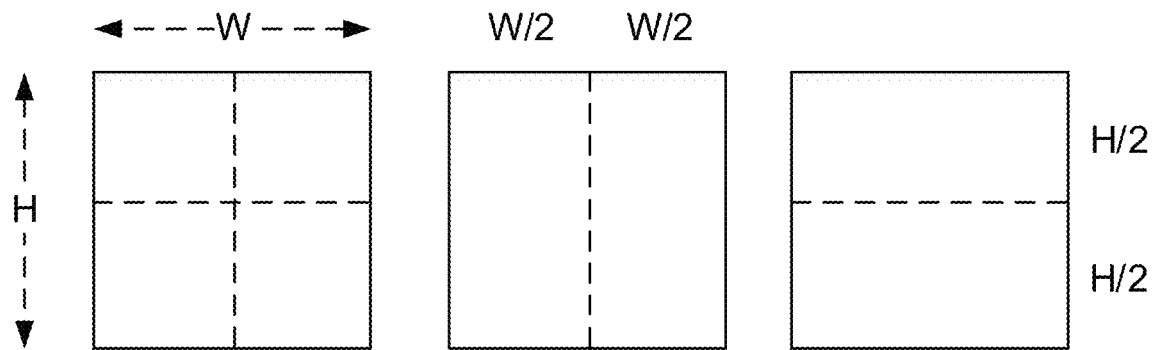
FIGS. 3A-3E show example splitting types, namely, quaternary partitioning (FIG. 3A), horizontal binary partitioning (FIG. 3B), vertical binary partitioning (FIG. 3C), horizontal ternary partitioning (FIG. 3D), and vertical ternary partitioning (FIG. 3E), according to example embodiments.
Figures 3D, 3E:
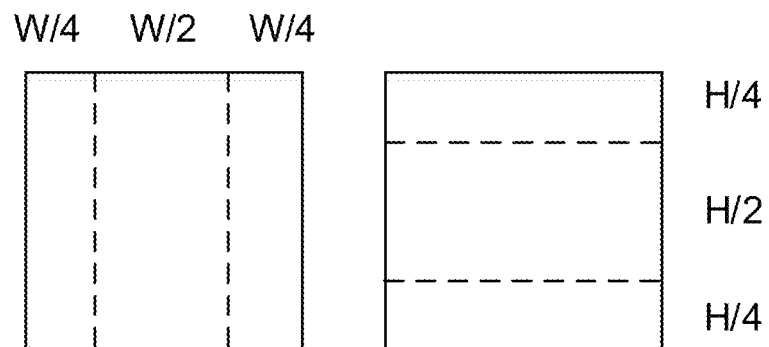

FIGS. 3A-3E shows five example splitting types, namely, quaternary partitioning (FIG. 3A), horizontal binary partitioning (FIG. 3B), vertical binary partitioning (FIG. 3C), horizontal ternary partitioning (FIG. 3D), and vertical ternary partitioning (FIG. 3E).

Figure 7:
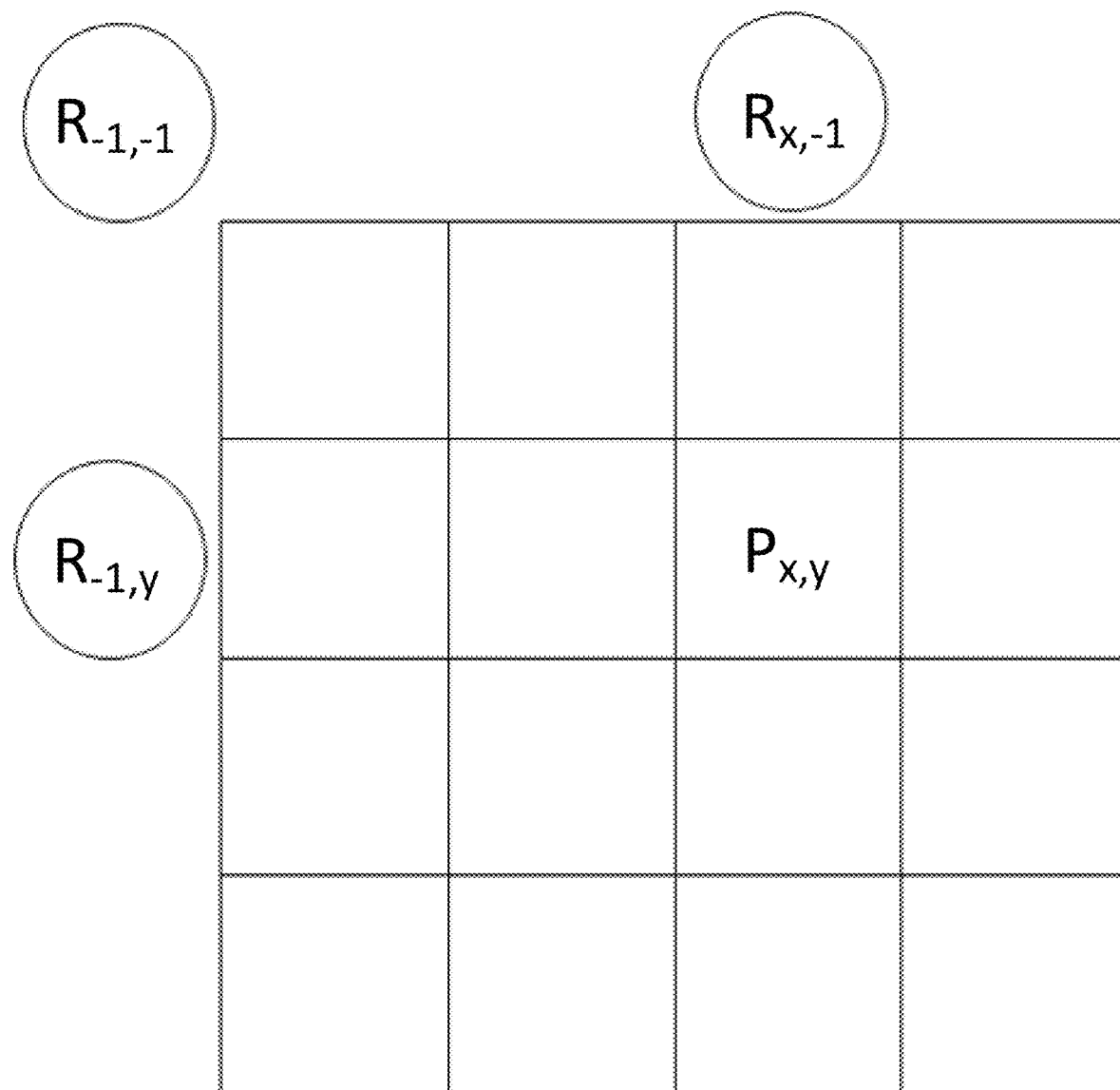
FIG. 7 shows locations of neighboring reconstructed samples that are used for position-dependent intra prediction combination (PDPC) of one coding block.

In general, the basic intra prediction scheme applied in VVC is kept the same as that of HEVC, except that several modules are further extended and/or improved, e.g., intra sub-partition (ISP) coding mode, extended intra prediction with wide-angle intra directions, position-dependent intra prediction combination (PDPC) and 4-tap intra interpolation. FIG. 7 shows locations of neighboring reconstructed samples that are used for PDPC of one coding block. Example methods as described herein facilitate improvement of the ISP design in the VVC standard. Below are several coding tools (e.g., the tools in the intra prediction and transform coding) included in the VVC and closely related to the example methods described herein.

Intra Prediction Modes with Wide-Angle Intra Directions

Figure 4:
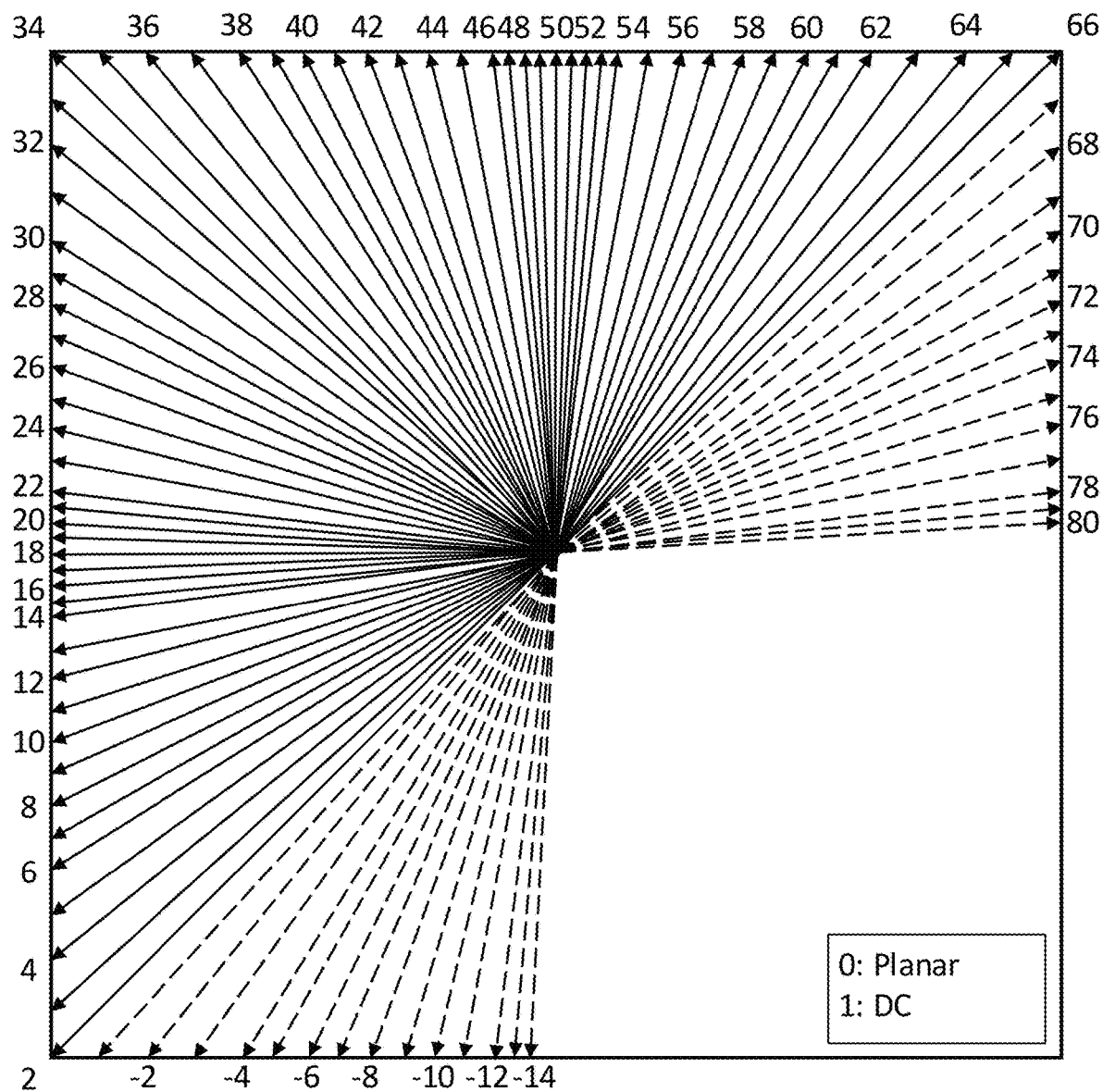
FIG. 4 shows example intra modes in VCC.

FIG. 4 illustrates the intra modes as defined in the VVC standard. Like HEVC, VVC uses a set of previously decoded samples neighboring a current CU (i.e., above the current CU or left of the current CU) to predict the samples of the CU. However, to capture finer edge directions present in natural video (especially for video content in high resolutions, e.g., 4K), the number of angular intra modes is extended from 33 angular intra modes in HEVC to 93 angular intra modes in VVC. In addition to angular directions, the same planar mode (which assumes a gradual changing surface with horizontal and vertical slope derived from boundaries) and DC mode (which assumes a flat surface) of HEVC are also applied in the VVC standard.

Similar to the intra prediction in HEVC, all the intra modes (i.e., planar, DC and angular directions) in VVC utilize a set of neighboring reconstructed samples above and left to the predicted block as the reference for intra prediction. However, different from HEVC where only the nearest row/column (i.e., line 0 in FIG. 5) of reconstructed samples are used as reference, a multi-reference line (MRL) is introduced in VVC where two additional rows/columns (i.e., line 1 and line 3 in FIG. 5) are used for the intra prediction. The index of the selected reference row/column is signaled from encoder 100 to decoder 200. When a non-nearest row/column is selected, planar and DC modes are excluded from the set of intra modes that can be used to predict the current block.

Figure 5:
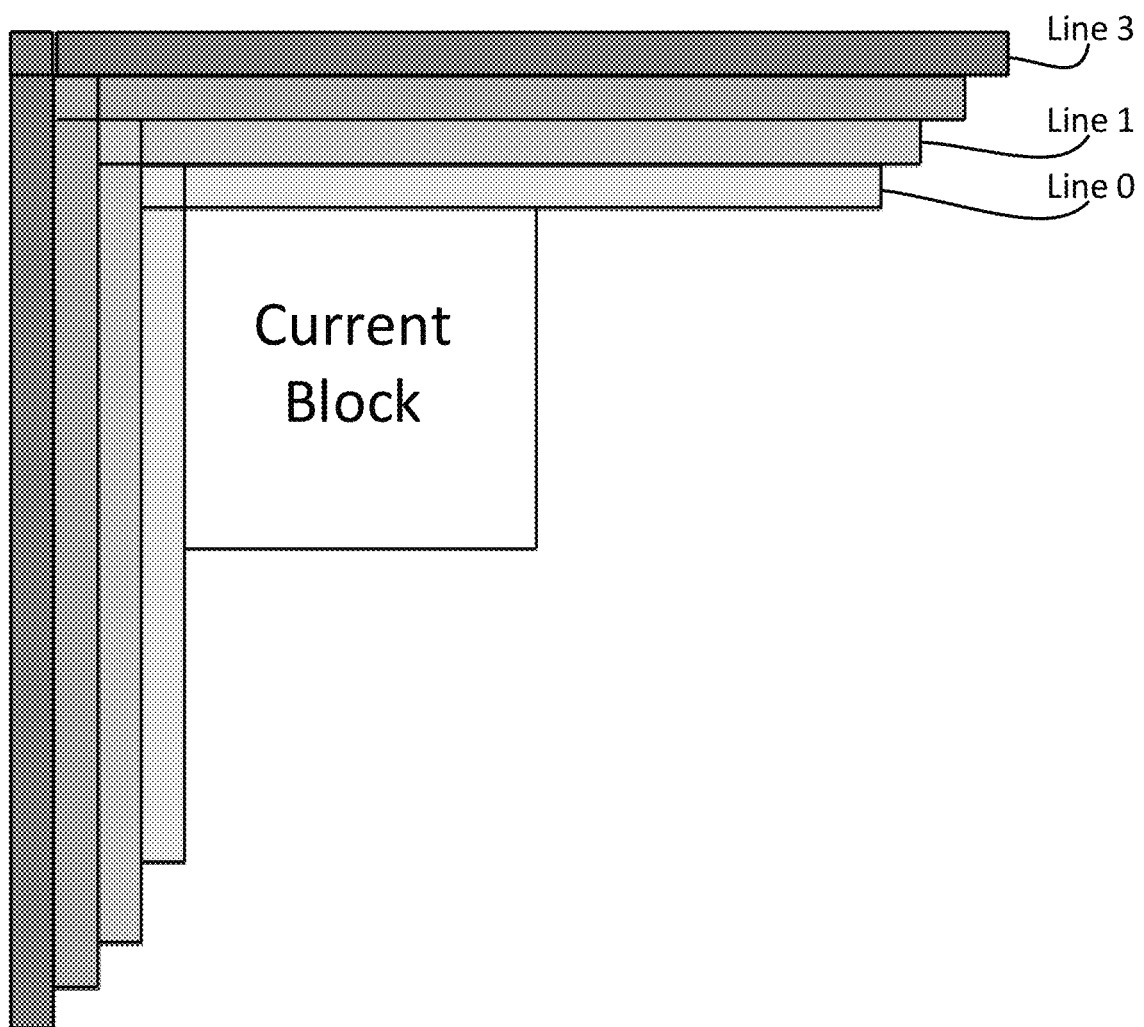
FIG. 5 shows multiple reference lines for the intra prediction in VCC.

FIG. 5 illustrates multiple reference lines for the intra prediction in VVC. Different from HEVC where only the nearest row or column (i.e., line 0 in FIG. 5) of reconstructed samples as reference, multi reference lines are introduced in VVC where two additional rows or columns (i.e., line 1 and line 3 in FIG. 5) are used for the intra prediction. The index of the selected reference row or column is signaled from encoder 100 to decoder 200. When a non-nearest row or column is selected, planar and DC modes are excluded from the set of intra modes that can be used to predict the current block.

Figure 6A:
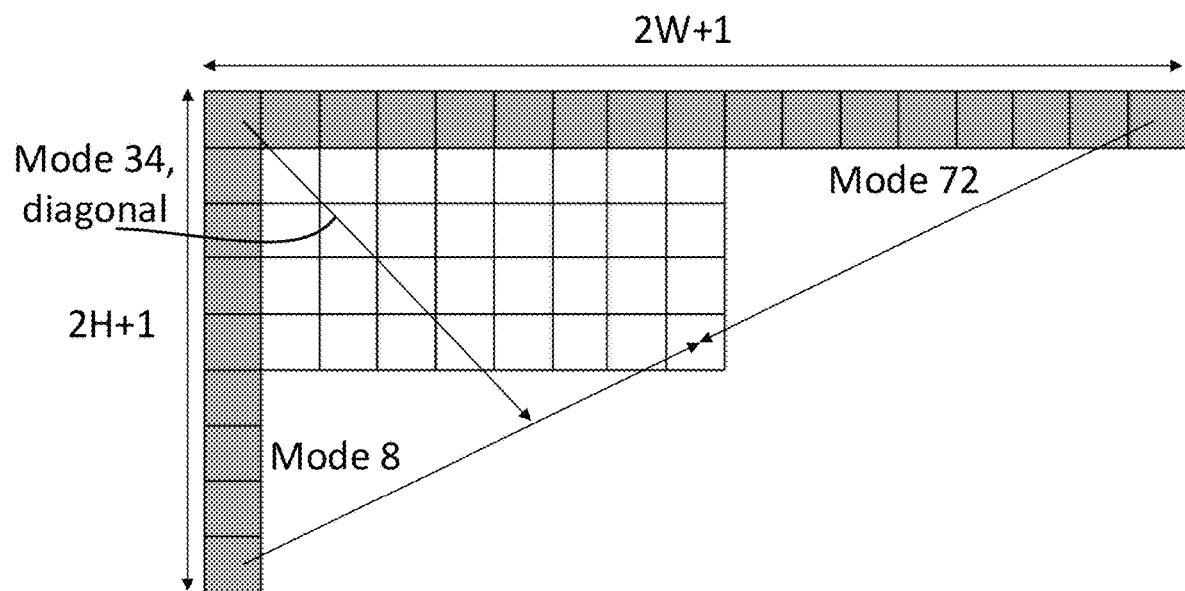
FIGS. 6A-6C show reference samples and angular directions that are used for the intra prediction of a flat rectangular block (W/H=2) as shown in FIG. 6A, a tall rectangular block (W/H=½) as shown in FIG. 6B, and a square block (W=H) as shown in FIG. 6C.
Figure 6B:
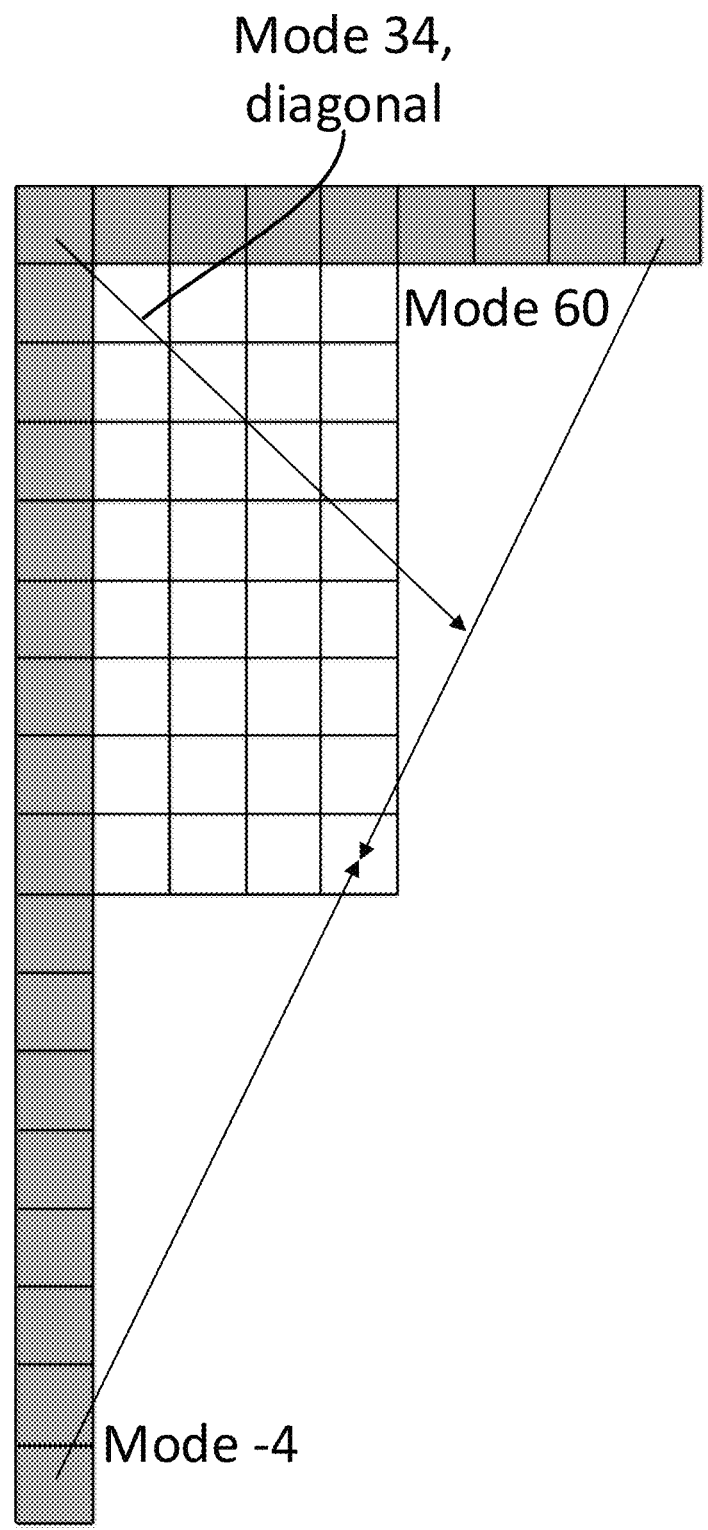
Figure 6C:
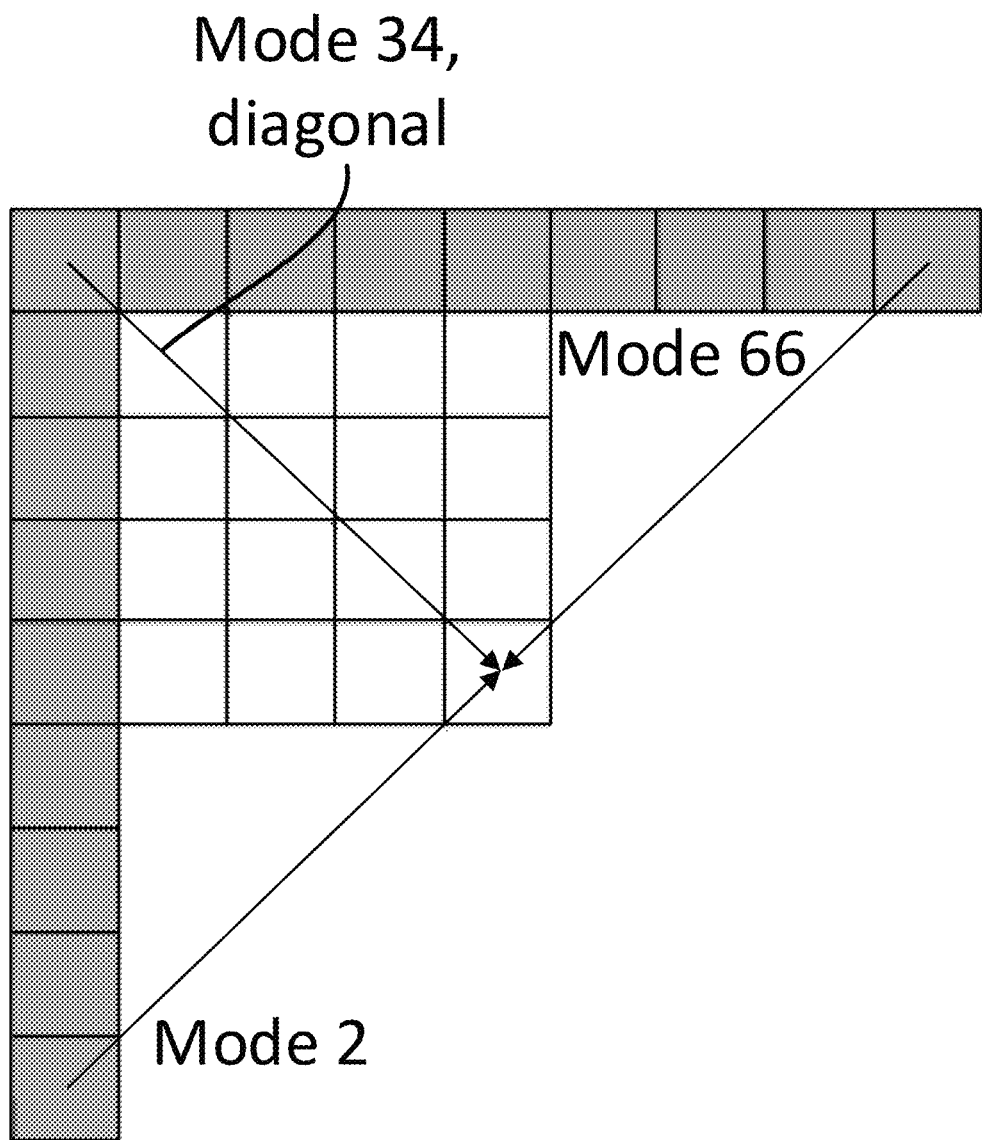

FIGS. 6A-6C illustrate locations of reference samples that are used in VVC to derive the predicted samples of one intra block. As shown in FIGS. 6A-6C, because the quad/binary/ternary tree partition structure is applied, besides the coding blocks in square shape, rectangular coding blocks also exist for the intra prediction of VVC. Due to the unequal width and height of one given block, various sets of angular directions are selected for different block shapes, which may be referred to as wide-angle intra prediction. More specifically, for both square and rectangular coding blocks, besides planar and DC modes, 65 angular directions out of 93 angular directions are also supported for each block shape, as shown in Table 1. Such design not only efficiently captures the directional structures that are typically present in video (by adaptively selecting angular directions based on block shapes) but also ensures that a total of 67 intra modes (i.e., planar, DC and 65 angular directions) are enabled for each coding block. As a result, a good efficiency of signaling intra modes is achieved while providing a consistent design across different block sizes.

Table 1 shows selected angular directions for the intra prediction of different block shapes in VCC.

TABLE 1

Selected Angular Directions for Intra Prediction of Different Block Shapes in VVC

| Block shape | Aspect ratio | Selected angular directions |
|---|---|---|
| Square, W = H | W/H == 1 | 2~66 |
| Flat rectangle, W > H | W/H == 2 | 8~72 |
| | W/H == 4 | 12~76 |
| | W/H == 8 | 14~78 |
| | W/H == 16 | 16~80 |
| | W/H == 32 | 17~81 |
| Tall rectangle, W < H | W/H == ½ | −4~60 |
| | W/H == ¼ | −8~56 |
| | W/H == ⅛ | −10~54 |
| | W/H == 1/16 | −12~52 |
| | W/H == 1/32 | −13~51 |

Context-Adaptive Binary Arithmetic Coding (CABAC)

Context-adaptive binary arithmetic coding (CABAC) is a form of entropy encoding used in H.264/MPEG-4 AVC and High Efficiency Video Coding (HEVC) standards and VVC. CABAC is based on arithmetic coding, with a few improvements and changes to adapt CABAC to the needs of video encoding standards. For example, CABAC encodes binary symbols, which keeps the complexity low and allows probability modelling for more frequently used bits of any symbol. The probability models are selected adaptively based on local context, allowing better modelling of probabilities, because coding modes are usually locally well correlated. CABAC also uses a multiplication-free range division by the use of quantized probability ranges and probability states.

CABAC has multiple probability modes for different contexts. It first converts all non-binary symbols to binary. Then, for each bin (or termed bit), the coder selects which probability model to use, then uses information from nearby elements to optimize the probability estimate. Arithmetic coding is finally applied to compress the data.

The context modeling provides estimates of conditional probabilities of the coding symbols. Utilizing suitable context models, a given inter-symbol redundancy can be exploited by switching between different probability models according to already-coded symbols in the neighborhood of the current symbol to encode.

Coding a data symbol involves the following stages:
Binarization: CABAC uses Binary Arithmetic Coding which means that only binary decisions (1 or 0) are encoded. A non-binary-valued symbol (e.g., a transform coefficient or motion vector) is "binarized" or converted into a binary code prior to arithmetic coding. This process is similar to the process of converting a data symbol into a variable length code, but the binary code is further encoded (by the arithmetic coder) prior to transmission;

Stages are repeated for each bin (or "bit") of the binarized symbol;

Context model selection: A "context model" is a probability model for one or more bins of the binarized symbol. This model may be chosen from a selection of available models depending on the statistics of recently coded data symbols. The context model stores the probability of each bin being "1" or "0";

Arithmetic encoding: An arithmetic coder encodes each bin according to the selected probability model. Note that there are just two sub-ranges for each bin (corresponding to "0" and "1"); and Probability update: The selected context model is updated based on the actual coded value (e.g., if the bin value was "1", the frequency count of "1" is increased).

Intra Sub-Partition Coding Mode

Intra mode may only utilize the reconstructed samples neighboring to one coding block to generate the intra prediction samples of the block. Based on such method, the spatial correlation between the predicted samples and the reference samples is roughly proportional to the distance between the predicted samples and the reference samples. Therefore, the samples at the inner part (especially the samples located at the bottom-right corner of the block) may have a worse prediction quality than the samples that are close to the block boundaries. To further improve the intra prediction efficiency, short distance intra prediction (SDIP) was proposed a long time ago and studied well during the development period of the HEVC standard. The method divides one intra coding block horizontally or vertically into multiple sub-blocks for prediction. Usually, a square block is divided into four sub-blocks. For example, an 8×8 block may be divided into four 2×8 or four 8×2 sub-blocks. One example of such sub-block based intra prediction is referred to as line-based prediction, wherein a block is divided into 1-D line/column for prediction. For example, one W×H (width×height) block can be split either into H sub-blocks in size of W×1 or into W sub-blocks in size of 1×H for intra prediction. Each of the resulting lines/columns are coded in the same way of normal 2-dimensional (2-D) block (as shown in FIG. 1), i.e., it is predicted by an available intra mode and the prediction error is decorrelated based on transform and quantization and sent to decoder 200 for reconstruction. Consequently, the reconstructed samples in one sub-block (e.g., a line/column) can be used as references to predict the samples in the next sub-block. The above process is repeated until all the sub-blocks within the current block are predicted and coded. Additionally, to reduce the signaling overhead, all sub-blocks within one coding block share the same intra mode.

With SDIP, different sub-block partitions may provide different coding efficiency. In general, line-based prediction offers the best coding efficiency because it provides "the shortest prediction distance" among different partitions. On the other hand, it also has the worst encoding/decoding throughput issue for codec hardware implementations. For example, considering a block with 4×4 sub-blocks versus the same block with 4×1 or 1×4 sub-blocks, the latter case is only one fourth of the throughput of the former case. In HEVC, the smallest intra prediction block size for luma is 4×4.

Figure 8A:
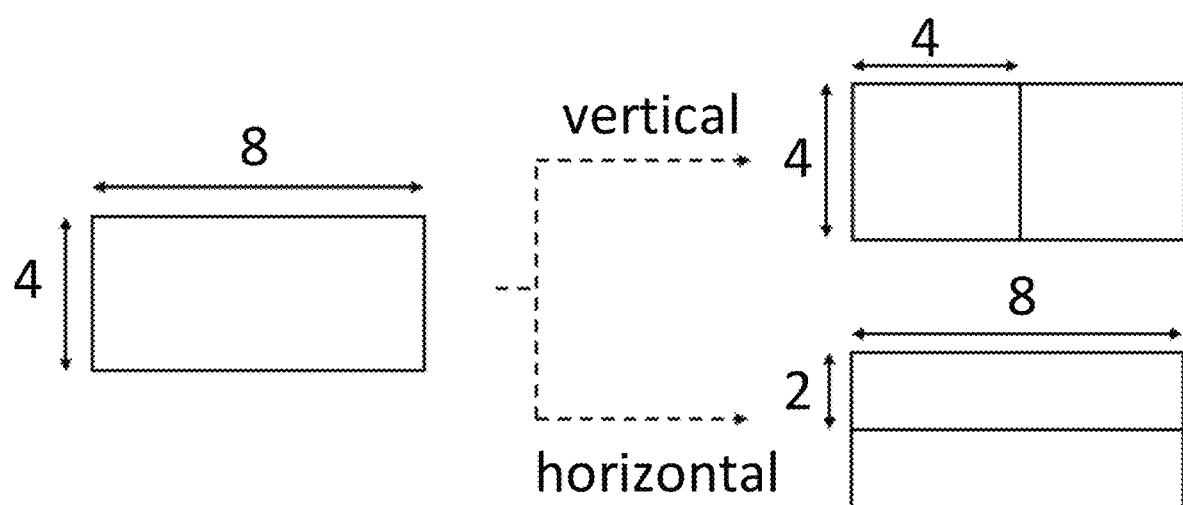
FIGS. 8A-8C show short-distance intra prediction (SDIP) partitions of 8×4 blocks as shown in FIG. 8A, 4×8 blocks as shown in FIG. 8B, and other blocks as shown in FIG. 8C.
Figure 8B:
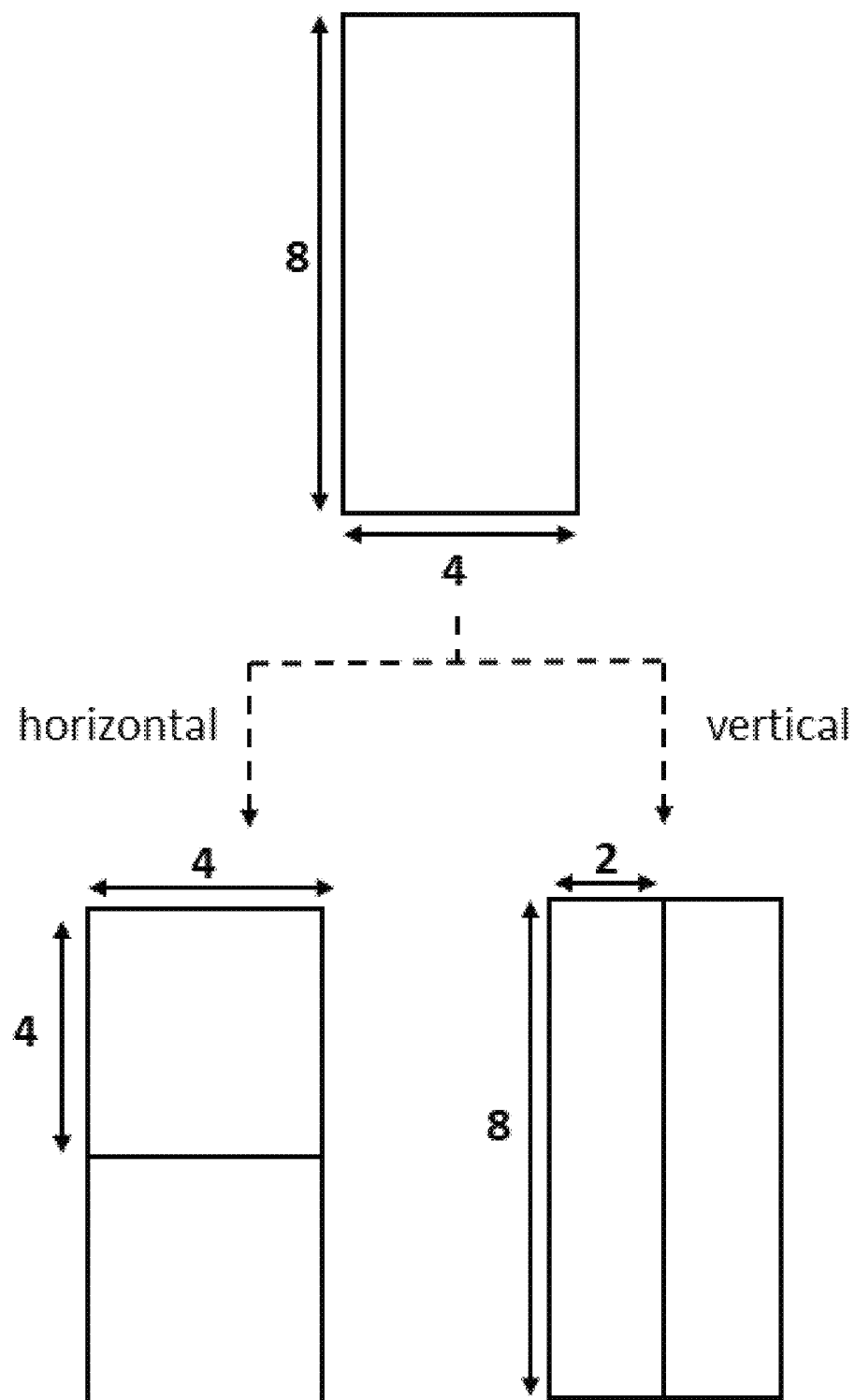
Figure 8C:
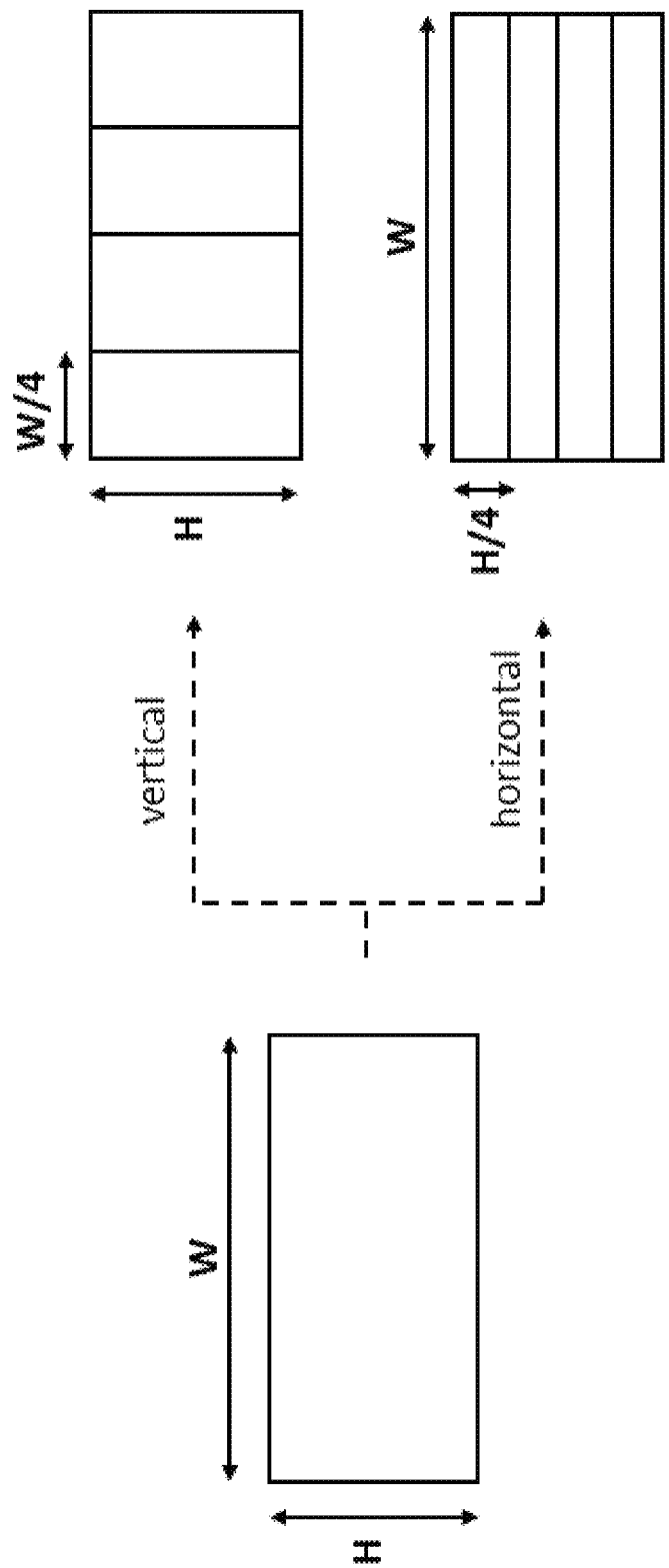

A video coding tool called sub-partition prediction (ISP) was introduced into VVC. Conceptually, ISP is very similar to SDIP. More specifically, depending on the block size, the ISP divides the current coding block into 2 or 4 sub-blocks in either a horizontal direction or a vertical direction and each sub-block contains at least 16 samples. FIGS. 8A-8C illustrate possible partition cases for different coding block sizes. Moreover, the following main aspects are also included in the current ISP design to handle its interaction with the other coding tools in VVC:

Interaction with wide-angle intra direction: the ISP is combined with the wide-angle intra direction. In an example design, the block size (i.e., the width/height ratio) that is used to determine whether a normal intra direction or its corresponding wide-angle intra direction should be applied is an original coding block, i.e., the block before sub-block partitions;

Interaction with multiple reference lines: the ISP cannot be jointly enabled with the multiple reference line. More specifically, in the current VVC signaling design, the ISP enabling/disabling flag is signaled after the MRL index. When one intra block has one non-zero MRL index (i.e., referring to non-nearest neighboring samples), the ISP enabling/disabling flag is not signaled but inferred as 0, i.e., ISP is automatically disabled for the coding block in this case;

Interaction with most probable mode: similar to normal intra mode, the intra mode that is used for one ISP block is signaled through the most probable mode (MPM) mechanism. However, compared to the normal intra mode, the following modifications are made to the MPM method for ISP: (1) each ISP block only enables the intra modes that are included in the MPM list and disables all other intra modes that are not in the MPM list; (2) for each ISP block, the MPM list excludes the DC mode and prioritizes the horizontal intra modes for ISP horizontal partition and vertical modes for ISP vertical partition, respectively;

At least one non-zero coded block flag (CBF): In VVC, a CBF flag is signaled for each transform unit (TU) to specify that the transform block contains one or more transform coefficient levels not equal to 0. Given a certain block using ISP, the decoder will assume that at least one of the sub-partitions has a non-zero CBF. For this reason, if n is the number of sub-partitions and the first n−1 sub-partitions have produced a zero CBF, then the CBF of the n-th sub-partition will be inferred to be 1. Therefore, it is not necessary to transmit and decode it; and Interaction with multiple transform selection (MTS): the ISP is exclusively applied with the MTS, i.e., when one coding block uses ISP, its MTS flag is not signaled but always inferred as 0, i.e., disabled. However, instead of always using the DCT-II transform, a fixed set of core transforms (including DST-VII and DCT-II) are implicitly applied to ISP coded blocks based on the block sizes. More specifically, assuming W is a width of one ISP sub-partition and H is a height of one ISP sub-partition, its horizontal and vertical transforms are selected according to the following rules as described in Table 2.

TABLE 2

Selected Horizontal and Vertical Transforms for ISP Blocks

| Sub-block size | Intra mode | Horizontal trans. | Vertical trans. |
| --- | --- | --- | --- |
| W = 2 or W > 32 | All available intra modes | DCT-II | DCT-II |
| H = 2 or H > 32 | All available intra modes | DCT-II | DCT-II |
| The other sub-block sizes | Planar, 31, 32, 34, 36, 37 | DCT-II | DCT-II |
|  | DC, 33, 35 | DCT-II | DCT-II |
|  | 2, 4, 6 . . . 28, 30, | DST-VII | DCT-II |

TABLE 2-continued

Selected Horizontal and Vertical Transforms for ISP Blocks

| Sub-block size | Intra mode | Horizontal trans. | Vertical trans. |
|---|---|---|---|
| | 39, 41, 43 . . . 63, 65<br>3, 5, 7, . . . 27, 29<br>38, 40, 42, . . . 64, 66 | DCT-II | DST-VII |

Sub-Block Transform for Inter Blocks

For an inter-predicted CU with a CBF (cu_cbf) equal to 1, the CU sub-block transform flag (cu_sbt_flag) may be signaled to indicate whether the whole residual block or a sub-part of the residual block is decoded and this coding mode is termed sub-block transform (SBT). When SBT is used for an inter CU, SBT type and SBT position information are further decoded from the bitstream.

Figure 9:
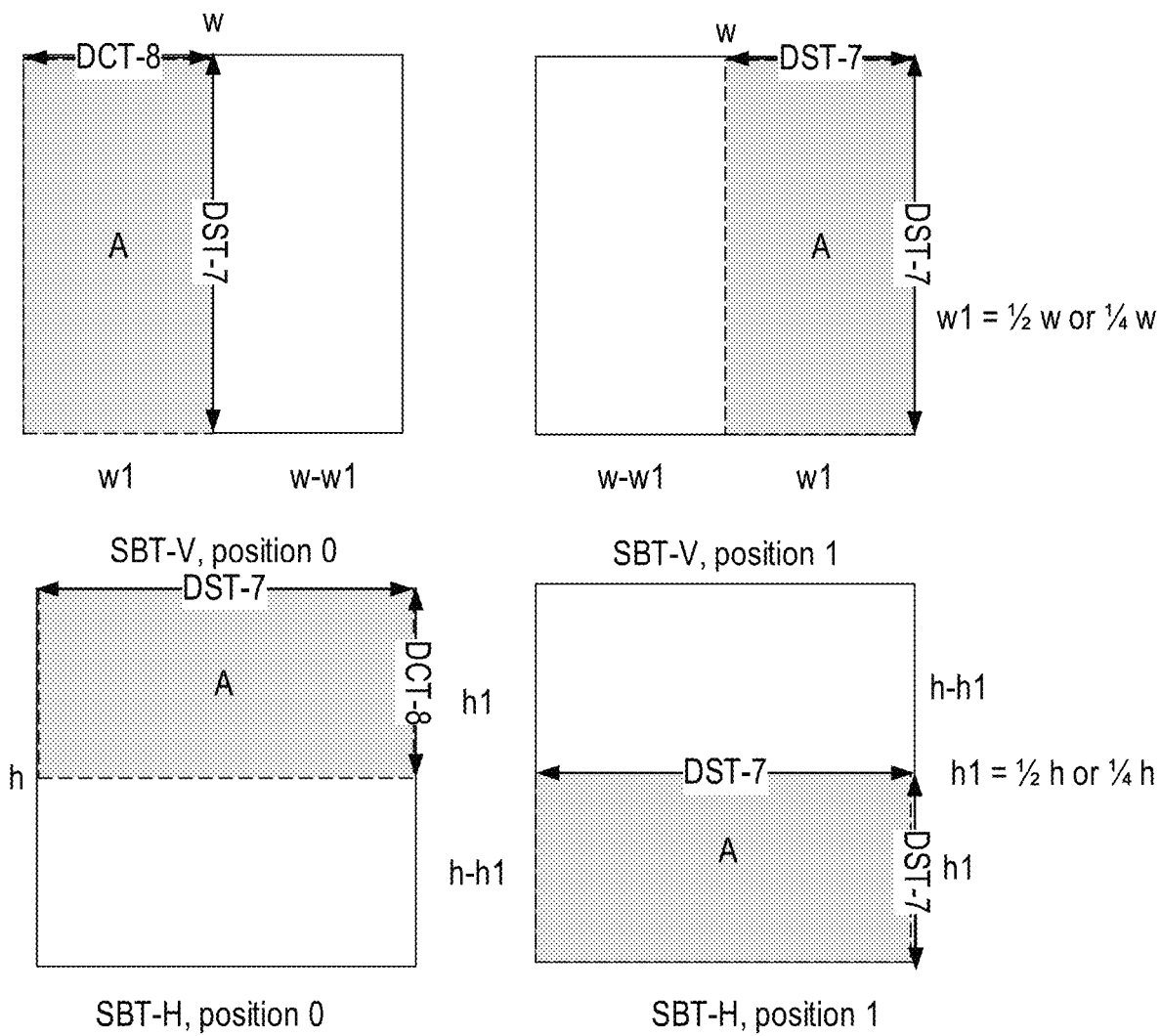
FIG. 9 shows sub-block transform modes sub-block transform (SBT)-V and SBT-H.

Position-dependent transform is applied on luma transform blocks in SBT-H and SBT-V (chroma TB always using DCT-2). The two positions of SBT-H and SBT-V are associated with different core transforms. More specifically, the horizontal and vertical transforms for each SBT position is specified in FIG. 9. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, the CBF, and the horizontal and vertical transforms of a residual block, which may be considered a syntax shortcut for cases were the major residual of a block is at one side of the block.

CBF Coding for a Transform Block in VVC

In VVC, a coded block flag (CBF) is signaled for each transform block (e.g., a luma transform block or chroma transform block) to indicate whether there are coefficients in this transform block. The CBF flags may also be used for a block coded as transform skip mode. For a transform skip coded block, the CBF flags are used to indicate whether the blocks contain non-zero residual or not. More specifically, the CBF for a luma transform block (tu_cbf_luma) equal to 1 specifies that the luma transform block contains one or more transform coefficient levels not equal to 0. It is noted that when tu_cbf_luma is not present in the current CU, its value is inferred as follows: If an intra prediction subpartition split type (IntraSubPartitionSplitType) is equal to ISP_NO_SPLIT (which means it is non-ISP mode), tu_cbf_luma is inferred to be equal to 0; otherwise, tu_cbf_luma is inferred to be equal to 1.

The CBF for a Cb chroma (Cb) transform block (tu_cbf_cb) equal to 1 specifies that the Cb transform block contains one or more transform coefficient levels not equal to 0. When tu_cbf_cb is not present in the current CU, its value is inferred to be equal to 0.

The CBF for a Cr chroma (Cr) transform block (tu_cbf_cr) equal to 1 specifies that the Cr transform block contains one or more transform coefficient levels not equal to 0. When tu_cbf_cr is not present in the current CU, its value is inferred to be equal to 0.

Derivation Process of ctxInc for Syntax Element tu_cbf_luma

There are four CABAC contexts that could be utilized to code the CBF of a luma transform unit (tu_cbf_luma). The procedure to determine the context index (ctxInc) is illustrated below. The variable transform block depth (trDepth) specifies whether the current transform block is smaller than the current CU.

If IntraSubpartitionSplitType is equal to ISP_NO_SPLIT or the current block is not a luma block, the following applies:

$$ctxInc = (trDepth == 0)?1:0$$

Otherwise (IntraSubpartitionSplitType is not equal to ISP_NO_SPLIT and the current transform block is a luma block), the following applies:

The variable CBF of the previous luma transform unit (prevTuCbfY) is derived as follows:

If the current transform unit is the first transform unit to be parsed in a coding unit, prevTuCbfY is set equal to 0; otherwise, prevTuCbfY is set equal to the value of tu_cbf_luma of the previous luma transform unit in the current coding unit.

The variable context index (ctxInc) of the luma transform unit is derived as follows:

$$ctxInc = 2 + prevTuCbfY$$

Derivation Process of ctxInc for Syntax Element tu_cbf_cb

There are two CABAC contexts that could be utilized to code the CBF of a Cb chroma (Cb) transform unit (tu_cbf_cb). The procedure to determine the context index (ctxInc) of the tu_cbf_cb is:

$$ctxInc = (trDepth == 0)? \ 0:1$$

Derivation Process of ctxInc for Syntax Element tu_cbf_cr

There are two CABAC contexts that could be utilized to code the CBF of a Cr chroma (Cr) transform unit (tu_cbf_cr). The procedure to determine the context index (ctxInc) of the tu_cbf_cr is:

ctxInc=the value of tu_cbf_cb of the corresponding Cb transform unit in the current coding unit.

Context Model Independent of trDepth

In VVC, trDepth can only take values 0 and 1. Because the largest transform size is equal to 64×64 and the maximum CTU size is 128×128, the depth resulting from an implicit split cannot exceed 1. Moreover, the trDepth is set to 1 for an ISP coded block, or when subblock transform (SBT) is enabled. In example embodiments, the context selection for the CABAC coding of CBF flags is not dependent on the trDepth. In other example embodiments, only one context is used for the CABAC coding of the CBF flag for the Cb component (e.g., tu_cbf_cb).

In another example embodiment, only two contexts are used for the CABAC coding of the CBF flag for a luma component (e.g., tu_cbf_luma) and a selection is dependent on a variable prevTuCbfY. The context index (ctxInc) is derived as follows:

If IntraSubpartitionSplitType is equal to ISP_NO_SPLIT (i.e., non-ISP mode) or the current block is not a luma block, ctxInc is set to 1; otherwise (IntraSubpartitionSplitType is not equal to ISP_NO_SPLIT (i.e., ISP mode) and the current transform block is a luma block), the following applies:

The variable prevTuCbfY is derived as follows:
If the current transform unit is the first transform unit to be parsed in a coding unit, prevTuCbfY is set equal to 0; otherwise, prevTuCbfY is set equal to the value of tu_cbf_luma of the previous luma transform unit in the current coding unit. The variable ctxInc of tu_cbf_luma is derived as follows:

$$ctxInc = prevTuCbfY$$

In another example, only two contexts are used for the CABAC coding of the CBF flag for a luma component (e.g. tu_cbf_luma) and the selection is dependent on the variable prevTuCbfY. The variable prevTuCbfY is derived as follows:
If IntraSubpartitionSplitType is equal to ISP_NO_SPLIT (i.e., Non-ISP mode) or a current block is not a luma block, the following applies:
The variable prevTuCbfY is derived as follows:
If tu_cbf_cr and tu_cbf_cb of the corresponding chroma transform blocks are both equal to 1, $$prevTuCbfY = 1,$$

otherwise (either tu_cbf_cr or tu_cbf_cb of the corresponding chroma transform blocks is equal to 0), $$prevTuCbfY = 0.$$

The variable ctxInc of tu_cbf_luma is derived as follows:

$$ctxInc = prevTuCbfY$$

Otherwise (IntraSubpartitionSplitType is not equal to ISP_NO_SPLIT (i.e., ISP mode) and a current transform block is a luma block), the following applies:
The variable prevTuCbfY is derived as follows:
If the current transform unit is the first transform unit to be parsed in a coding unit, prevTuCbfY is set equal to 0; otherwise, prevTuCbfY is set equal to the value of tu_cbf_luma of the previous luma transform unit in the current coding unit.
The variable ctxInc of tu_cbf_luma is derived as follows:

$$ctxInc = prevTuCbfY.$$

Context Model Independent of ISP Mode

In VVC, the context mode with an index equal to 3 and 4 is used for coding tu_cbf_luma when a current block is coded in ISP mode and the context selection is based on the variable prevTuCbfY as described in the previous section. However, the additional contexts may not by efficient and, thus, may be removed. In another example embodiment, only two contexts are used for the CABAC coding of the CBF flag for a luma component (i.e., tu_cbf_luma) and the selection is dependent on the variable trDepth. The variable trDepth is derived as follows:

If IntraSubpartitionSplitType is not equal to ISP_NO_SPLIT, $$trDepth = 1$$

Otherwise, if the size of the transform block is smaller than the size of current CU (e.g., SBT is used or a four 64×64 transform block is implicitly used for a 128×128 CU)

$$trDepth = 1,$$

otherwise, $$trDepth = 0$$

The variable ctxInc of tu_cbf_luma is derived as follows:

$$ctxInc = trDepth.$$

Context Model Dependent on Transform Size for CBF Coding

According to another example embodiment, a size of a transform block is used to determine the context model for the CABAC coding of the CBF flags. For example, when the current transform block is greater or equal to a predefined size, one context model is selected; otherwise, another context model is selected.

Context Model Dependent on Prediction Modes for CBF Coding

According to another example embodiment, information of the coded prediction modes is used to determine the context model for the CABAC coding of the CBF flags. For example, when the current transform block belongs to an inter coded CU, one context model is selected; otherwise, another context model is selected. In particular example embodiments, the mode information may further include the Affine mode or the AMVP mode, for example.

Significantly Simplified Context Model Design for CBF Coding

According to another example embodiment, CBF flags of luma blocks are all coded using one CABAC context. CBF flags of Cb blocks are also all coded using another CABAC context. CBF flags of Cr blocks are coded using two contexts, with its contexts selected depending on the value of the corresponding CBF of the Cb block for a given CU. More specifically, the selection of the context model for the CABAC coding of CBF flags of luma, Cb, and Cr transform blocks is illustrated below.

Derivation Process of ctxInc for Syntax Element tu_cbf_luma

There is only one CABAC context utilized for coding the tu_cbf_luma and, thus, the procedure for the context model selection is not needed.

Derivation Process of ctxInc for Syntax Element tu_cbf_ch

There is only one CABAC context utilized for coding the tu_cbf_cb and, thus, the procedure for the context model selection is not needed.

Derivation Process of ctxInc for Syntax Element tu_cbf_cr

There are two CABAC contexts that may be utilized for coding the tu_cbf_cr and the procedure to determine the context index (ctxInc) of tu_cbf_luma is represented by the following:

ctxInc=the value of tu_cbf_cb of the corresponding Cb transform unit in the current coding unit.

Alternative Context Model Design for CBF Coding for VVC

In VVC, trDepth can only take values 0 and 1; therefore, it is possible to use the value of trDepth directly to select the context without any comparison operations. As explained in the "CBF Coding for a Transform Block in VVC" section above, some context selections of the CBF coding in VVC require a comparison operation. For example, in determining a context model index for a luma CBF, the following operation is defined:

$$ctxInc = (trDepth == 0) ? \ 0 : 1$$

Such comparison operation can be avoided with slight modifications to the CBF context model design. More specifically, the initial luma CBF CABAC context model index 0 and index 1 can simply be switched, together with the corresponding initialization probability setting.

In sum, in this example embodiment, the selection of the context model for the CABAC coding of CBF flags may not be necessary when there is only one CABAC context. In the event there are two CABAC contexts, the selection can still be made without any comparison operations because trDepth can only take values 0 and 1 and the value of trDepth can be used directly to select the context.

According to another example, CABAC context selection is determined based on the following conditions and procedures.

Derivation Process of ctxInc for Syntax Element tu_cbf_luma

There are four CABAC contexts that could be utilized for coding the tu_cbf_luma. If IntraSubpartitionSplitType is equal to ISP_NO_SPLIT or a current block is not a luma block, the following applies:

$$ctxInc = trDepth,$$

Otherwise (i.e., IntraSubpartitionSplitType is not equal to ISP_NO_SPLIT and the current transform block is a luma block), the following applies:

The variable prevTuCbfY is derived as follows:

If the current transform unit is the first one to be parsed in a coding unit, prevTuCbfY is set equal to 0; otherwise, prevTuCbfY is set equal to the value of tu_cbf_luma of the previous luma transform unit in the current coding unit.

The variable ctxInc of tu_cbf_luma is derived as follows:

$$ctxInc = 2 + prevTuCbfY$$

Derivation Process of ctxInc for Syntax Element tu_cbf_cb

There are two CABAC contexts that could be utilized for coding the tu_cbf_cb. The procedure to determine the context index (ctxInc) of tu_cbf_cb is:

$$ctxInc = trDepth$$

Derivation Process of ctxInc for Syntax Element tu_cbf_cr

There are two CABAC contexts that could be utilized to code the tu_cbf_cr. The procedure to determine the context index (ctxInc) of tu_cbf_cr is:

ctxInc=the value of tu_cbf_cb of the corresponding Cb transform unit in the current coding unit.

FIGS. 10A-10E are flowcharts for a method 300 for coding a coded block flag (CBF) using Context-adaptive binary arithmetic coding (CABAC) according to example embodiments. Method 300 shown in FIGS. 10A-10F is explained with respect to encoder 100 of FIG. 1 and/or decoder 200 of FIG. 2. However, in other examples, other devices may be configured to perform method 300 shown in FIGS. 10A-10E.

In example embodiments, a first context model is utilized 302 for coding a first CBF of a first chroma transform unit, for example, a Cr chroma (Cr) transform unit (tu_cbf_cr). A second context model is utilized 304 for coding a second CBF of a second chroma transform unit, for example, a Cb chroma (Cb) transform unit (tu_cbf_cb). Two context modes are also utilized 306 for coding a third CBF of a luma transform unit (tu_cbf_luma). For example, two contexts may be used for tu_cbf_cb, and the selection of the contexts is derived by the BDPCM mode flag: intra_bdpcm_chroma_flag? 1:0. Three contexts are used for tu_cbf_cr, and the selection of the contexts is derived by the BDPCM mode flag and the value of tu_cbf_cb: intra_bdpcm_chroma_flag? 2:tu_cbf_cb[ ][ ]. Four contexts are used for tu_cbf_luma, and the selection of the contexts is derived by the BDPCM mode flag, ISP flag and variable prevTuCbfY. The conext index ctxInc for tu_cbf_luma is derived as follows:

1) If BdpcmFlag[x0][y0][0] is equal to 1, ctxInc is set equal to 1.
2) Otherwise, if IntraSubpartitionsSplitType is equal to ISP_NO_SPLIT, ctxInc is set equal to 0.
3) Otherwise (BdpcmFlag[x0][y0][0] is equal to 0 and IntraSubpartitionsSplitType is not equal to ISP_NO_SPLIT), the following applies:
   The variable prevTuCbfY is derived as follows:
   If the current transform unit is the first one to be parsed in a coding unit, prevTuCbfY is set equal to 0.
   Otherwise, prevTuCbfY is set equal to the value of tu_cbf_luma of the previous luma transform unit in the current coding unit.
   The variable ctxInc is derived as follows:
   ctxInc=2+prevTuCbfY Referring further to FIG. 10A, in a particular example embodiment, the context model is independent of the transform depth (trDepth). For example, utilizing 306 two context modes for coding the third CBF of the luma transform unit may depend on a variable of a CBF for a previous luma transform unit (prevTuCbfY). In this particular embodiment, method 300 further includes deriving 308 a context index (ctxInc) for the luma transform unit (tu_cbf_luma). When IntraSubpartitionSplitType is equal to ISP_NO_SPLIT (which means it is in a non-ISP mode), the context index is set 310 to a first context index of a first context mode of the two context modes. In certain example embodiments, the context index is set 310 equal to 1. When IntraSubpartitionSplitType is not equal to ISP_NO_SPLIT, utilizing 306 two context modes for coding the third CBF of the luma transform unit includes deriving 312 a variable prevTuCbfY. In example embodiments, deriving 312 the variable prevTuCbfY includes setting 314 prevTuChfY equal to 0 when the current transform unit is a first transform unit to be parsed in a current coding unit or setting 316 prevTuCbfY equal to a value of a CBF of the luma transform unit (tu_cbf_luma) of a previous luma transform unit in the current coding unit. In this particular embodiment, the context index (ctxInc) for the luma transform unit is derived by setting 318 the context index (ctxInc) for the luma transform unit equal to a second context index of a second context mode of the two context modes, wherein the second context index is derived by prevTuCbfY. In certain example embodiments, the context index is set 318 equal to prevTuCbfY.

Figure 10A:
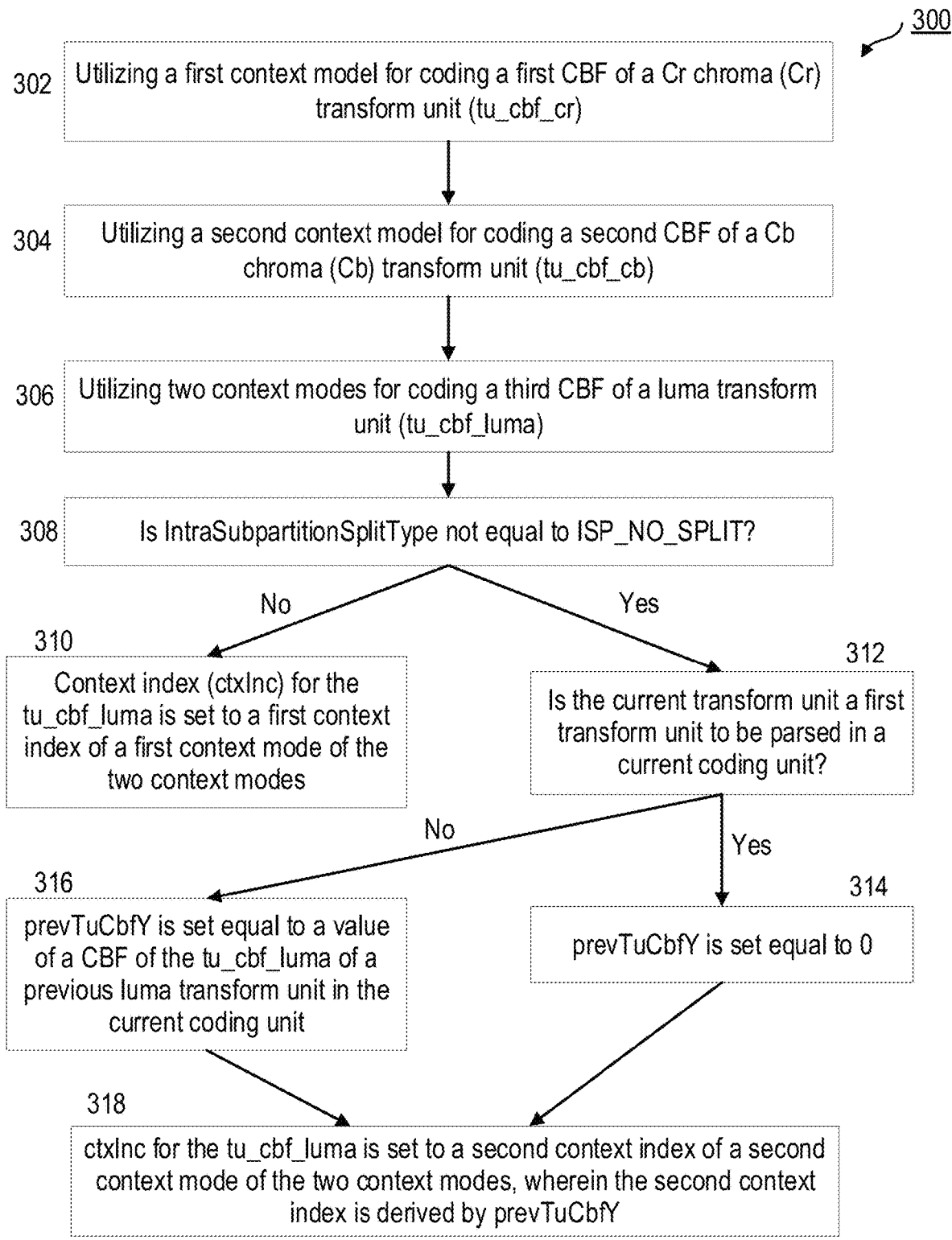
FIGS. 10A-10F are flowcharts for a method for coding a coded block flag (CBF) using Context-adaptive binary arithmetic coding (CABAC) according to example embodiments.
Figure 10B:
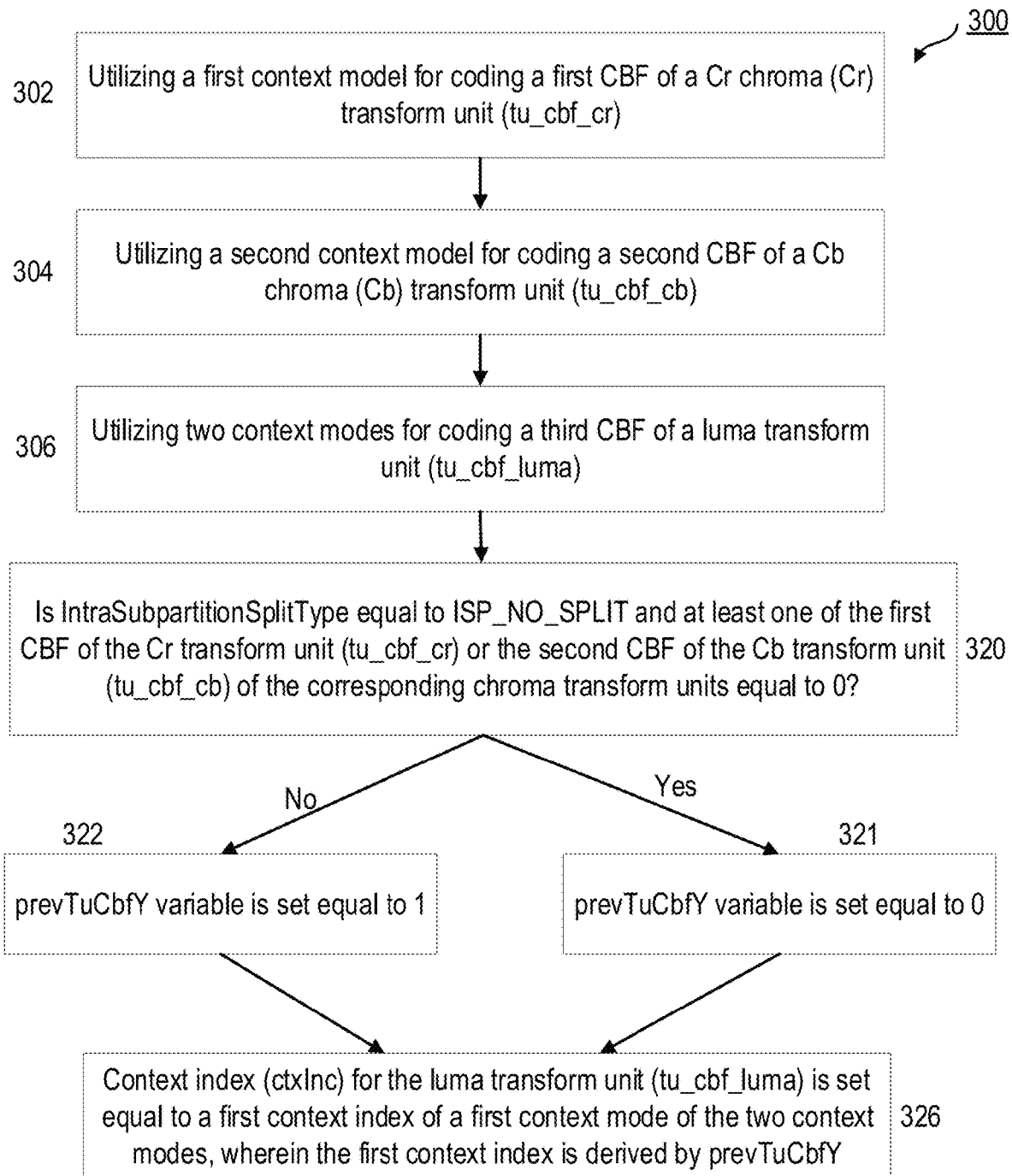

Referring further to FIG. 10B, in another example embodiment, utilizing 306 two context modes for coding the third CBF of the luma transform unit depends on a prevTuCbfY variable. In this particular embodiment, method 300 includes deriving 320 the prevTuCbfY variable. The prevTuCbfY variable is set 322 equal to 1 when IntraSubpartitionSplitType is equal to ISP_NO_SPLIT and the first CBF of the Cr transform unit (tu_cbf_cr) and the second CBF of the Cb transform unit (tu_cbf_cb) of corresponding chroma transform units are both equal to 1. Alternatively, the prevTuCbfY variable is set 324 equal to 0 when at least one of the first CBF of the Cr transform unit (tu_cbf_cr) or the second CBF of the Cb transform unit (tu_cbf_cb) of the corresponding chroma transform units is equal to 0. In this embodiment, deriving a context index (ctxInc) for the luma transform unit includes setting 326 the context index (ctxInc) for the luma transform unit equal to a first context index of a first context mode of the two context modes, wherein the first context index is derived by prevTuCbfY.

Figure 10C:
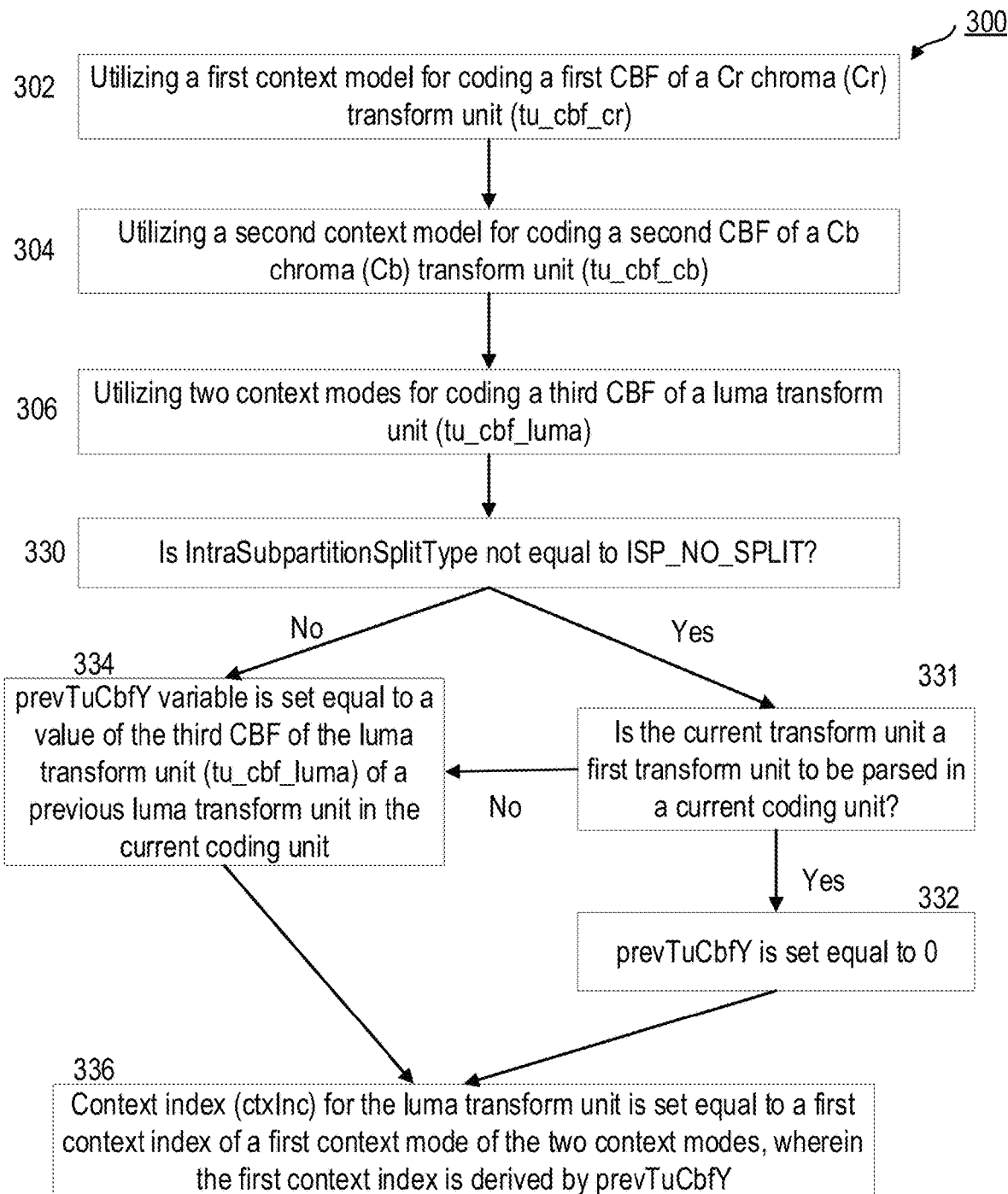

As shown in FIG. 10C, in another example embodiment, utilizing 306 two context modes for coding the third CBF of the luma transform unit depends on a prevTuCbfY variable. In this particular embodiment, method 300 includes deriving 330 the prevTuCbfY variable depending on one or more conditions including whether IntraSubpartitionSplitType is not equal to ISP_NO_SPLIT. The one or more conditions may include 331 whether the current transform unit is a first transform unit to be parsed in a current coding unit. The prevTuCbfY variable is set 332 equal to 0 when IntraSubpartitionSplitType is not equal to ISP_NO_SPLIT, and when the current transform unit is a first transform unit to be parsed in a current coding unit. Alternatively, the prevTuCbfY variable is set 334 equal to a value of the third CBF of the luma transform unit (tu_cbf_luma) of a previous luma transform unit in the current coding unit. In this particular embodiment, a context index (ctxInc) for the luma transform unit is derived by setting 336 the context index (ctxInc) for the luma transform unit equal to a first context index of a first context mode of the two context modes, wherein the first context index is derived by prevTuCbfY.

Figure 10D:
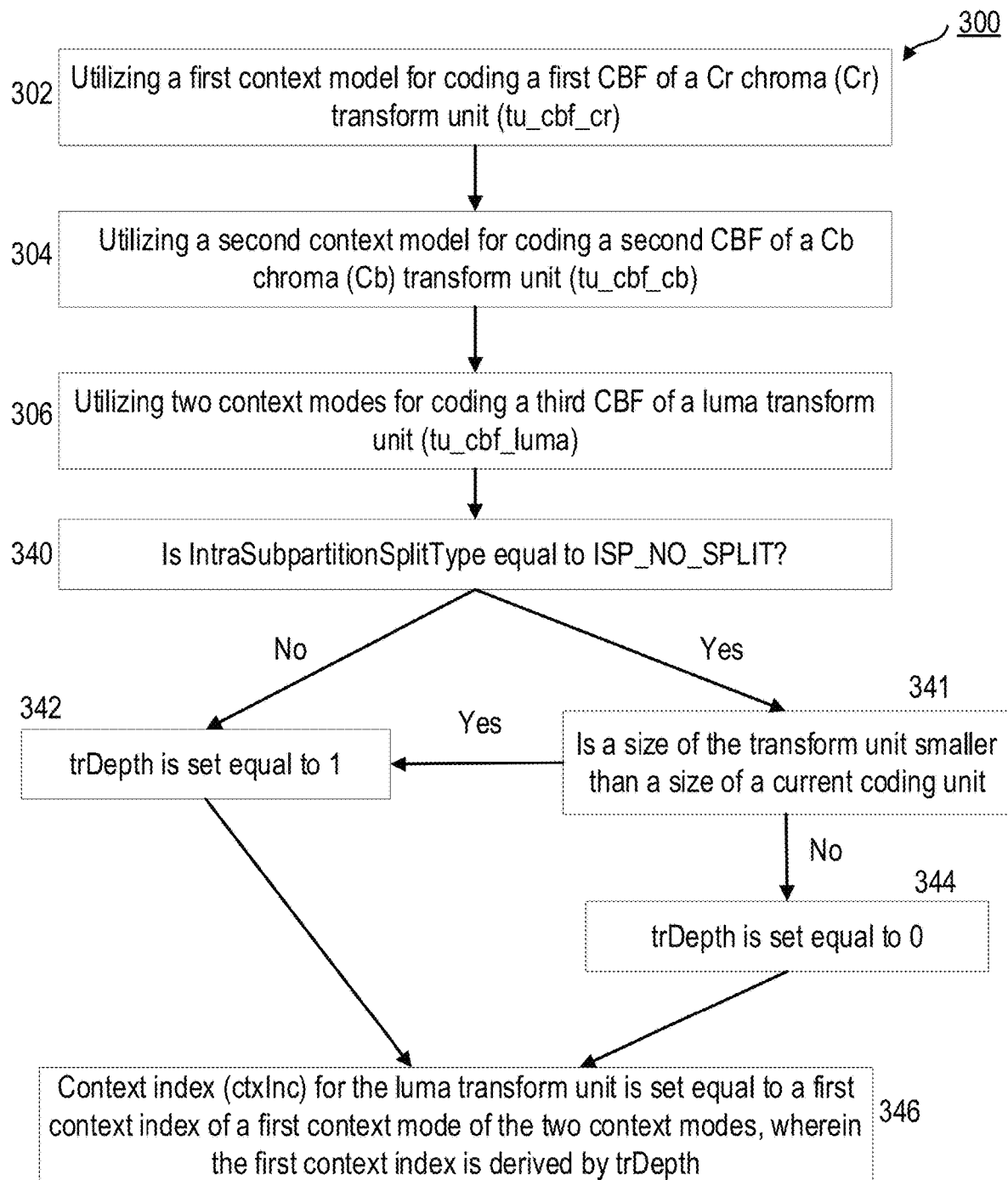

Referring further to FIG. 10D, in another example embodiment, the context model is independent of the ISP mode. In this particular embodiment, method 300 includes utilizing 306 two context modes for coding the third CBF of the luma transform unit that depends on a trDepth variable. Method 300 includes deriving 340 a trDepth variable depending on one or more conditions including whether IntraSubpartitionSplitType is equal to ISP_NO_SPLIT. When IntraSubpartitionSplitType is not equal to ISP_NO_SPLIT, trDepth is set 342 equal to 1. Alternatively, when IntraSubpartitionSplitType is equal to ISP_NO_SPLIT trDepth is set depending on 341 whether a size of the transform unit is smaller than a size of a current coding unit. For example, when a size of the transform unit is smaller than a size of a current coding unit, trDepth is set 342 equal to 1, or trDepth is set 344 equal to 0. In this particular embodiment, a context index (ctxInc) for the luma transform unit is derived by setting 346 the context index (ctxInc) for the luma transform unit equal to a first context index of a first context mode of the two context modes, wherein the first context index is derived by trDepth.

In another example embodiment, the context model is dependent on a transform size for CBF coding. In a particular embodiment, when a current transform unit is equal to or greater than a predefined size, the first context model is selected from a plurality of context models and when the current transform unit is less than a predefined size, another context model is selected from the plurality of context models.

In yet another example embodiment, the context model is dependent on prediction modes for CBF coding. In a particular embodiment, when a current transform unit belongs to an inter coded coding unit (CU), the first context model is selected from a plurality of context models and when the current transform unit does not belong to an inter coded CU, another context model is selected from the plurality of context models.

Figure 10E:
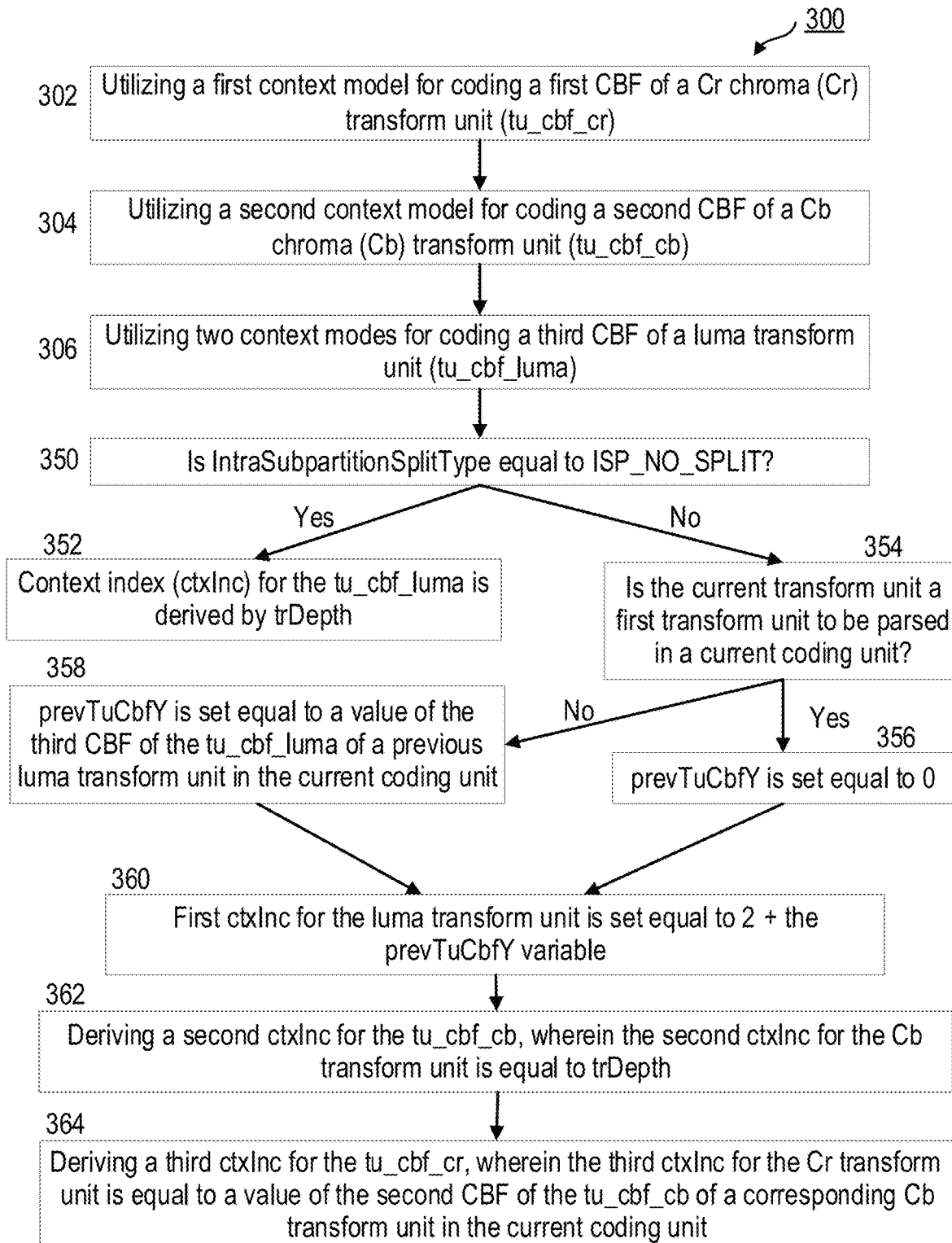

In an alternative example embodiment, as shown in FIG. 10E, an alternative context model design is provided for CBF coding for VVC. In this embodiment, utilizing 306 two context modes for coding the third CBF of the luma transform unit includes deriving 350 a first context index (ctxInc) for the luma transform unit (tu_cbf_luma) in response to one or more conditions including whether IntraSubpartitionSplitType is equal to ISP_NO_SPLIT. When IntraSubpartitionSplitType is equal to ISP_NO_SPLIT, deriving 350 a first context index (ctxInc) for the luma transform unit (tu_cbf_luma) includes setting the 352 first ctxInc for the luma transform unit equal to a first context index of a first context mode of the two context modes, wherein the first context index is derived by trDepth.

Alternatively, when IntraSubpartitionSplitType is not equal to ISP_NO_SPLIT, a prevTuCbfY variable is derived 354, wherein the prevTuCbfY variable is set 356 equal to 0 when the current transform unit is a first transform unit to be parsed in a current coding unit, or the prevTuCbfY variable is set 358 equal to a value of the third CBF of the luma transform unit (tu_cbf_luma) of a previous luma transform unit in the current coding unit. In this particular embodiment, the first ctxInc for the luma transform unit is derived 360, wherein the first ctxInc for the luma transform unit is equal to 2+the prevTuCbfY variable. A second context index (ctxInc) for the Cb transform unit (tu_cbf_cb) is then derived 362. The second ctxInc for the Ch transform unit is equal to trDepth. A third context index (ctxInc) for the Cr transform unit (tu_cbf_cr) is then derived 364, wherein the third ctxInc for the Cr transform unit is equal to a value of the second CBF of the Cb transform unit (tu_cbf_cb) of a corresponding Cb transform unit in the current coding unit.

Figure 10F:
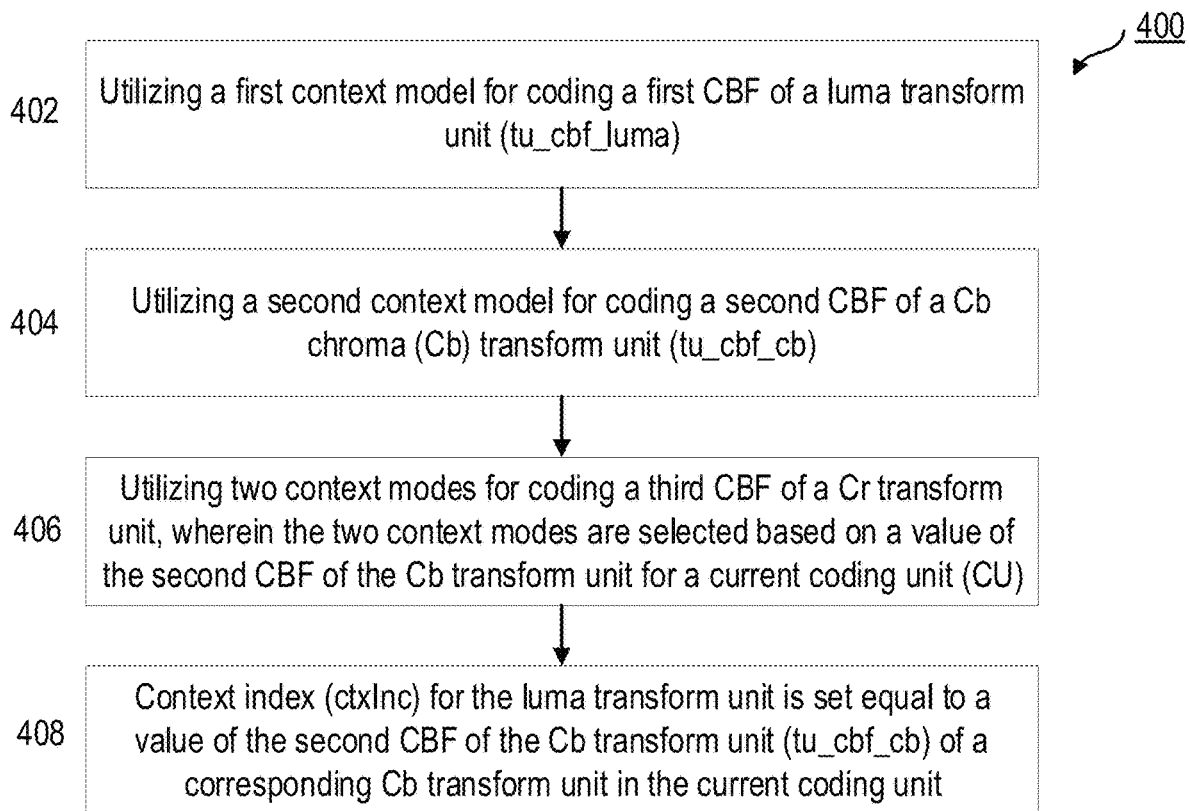

Referring further to FIG. 10F, in another example embodiment, a significantly simplified context model design for CBF coding is provided. In this embodiment, a method 400 for coding a coded block flag (CBF) using Context-adaptive binary arithmetic coding (CABAC). Method 400 includes utilizing 402 a first context model for coding a first CBF of a luma transform unit (tu_cbf_luma). A second context model is utilizing 404 for coding a second CBF of a Cb transform unit (tu_cbf_cb). Two context modes are utilizing 406 for coding a third CBF of a Cr transform unit, wherein the two context modes are selected based on a value of the second CBF of the Cb transform unit for a current coding unit (CU). A context index (ctxInc) for the luma transform unit is derived 408. In this embodiment, context index (ctxInc) for the luma transform unit is set equal to a value of the second CBF of the Ch transform unit (tu_cbf_cb) of a corresponding Cb transform unit in the current coding unit.

The example methods shown in FIGS. 10A-10F represent example methods for coding a coded block flag (CBF) using Context-adaptive binary arithmetic coding (CABAC) according to example embodiments.

Example embodiments of the disclosure can be described in view of the following clauses:

Clause 1. A method for coding a coded block flag (CBF) using Context-adaptive binary arithmetic coding (CABAC), the method comprising: utilizing a first context model for coding a first CBF of a Cr chroma (Cr) transform unit (tu_cbf_cr); utilizing a second context model for coding a second CBF of a Cb chroma (Cb) transform unit (tu_cbf_cb); and utilizing two context modes for coding a third CBF of a luma transform unit (tu_cbf_luma).

Clause 2. The method of clause 1, wherein utilizing two context modes for coding the third CBF of the luma transform unit (tu_cbf_luma) depends on a prevTuCbfY variable, the method further comprising deriving a context index (ctxInc) for the luma transform unit (tu_cbf_luma), wherein when IntraSubpartitionSplitType is equal to ISP_NO_SPLIT, the context index is set to a first context index of a first context mode of the two context modes.

Clause 3. The method of clause 1, wherein utilizing two context modes for coding the third CBF of the luma transform unit (tu_cbf_luma) further comprises, when IntraSubpartitionSplitType is not equal to ISP_NO_SPLIT, deriving a variable prevTuCbfY comprises setting prevTuCbfY equal to 0 when the current transform unit is a first transform unit to be parsed in a current coding unit; or setting prevTuCbfY equal to a value of a CBF of the luma transform unit (tu_cbf_luma) of a previous luma transform unit in the current coding unit.

Clause 4. The method of clause 3, further comprising deriving a context index (ctxInc) for the luma transform unit (tu_cbf_luma) equal to a second context index of a second context mode of the two context modes, wherein the second context index is derived by prevTuCbfY.

Clause 5. The method of clause 1, wherein utilizing two context modes for coding the third CBF of the luma transform unit (tu_cbf_luma) depends on a prevTuCbfY variable, the method further comprising deriving the prevTuCbfY variable, wherein the prevTuCbfY variable is equal to 1 when IntraSubpartitionSplitType is equal to ISP_NO_SPLIT and the first CBF of the Cr transform unit (tu_cbf_cr) and the second CBF of the Cb transform unit (tu_cbf_cb) of corresponding chroma transform units are both equal to 1, or the prevTuCbfY variable is equal to 0 when at least one of the first CBF of the Cr transform unit (tu_cbf_cr) or the second CBF of the Cb transform unit (tu_cbf_cb) of the corresponding chroma transform units is equal to 0.

Clause 6. The method of clause 5, further comprising deriving a context index (ctxInc) for the luma transform unit (tu_cbf_luma) equal to a first context index of a first context mode of the two context modes, wherein the first context index is derived by prevTuCbfY.

Clause 7. The method of clause 1, wherein utilizing two context modes for coding the third CBF of the luma transform unit (tu_cbf_luma) depends on a prevTuCbfY variable, the method further comprising deriving the prevTuCbfY variable, wherein the prevTuCbfY variable is equal to 0 when IntraSubpartitionSplitType is not equal to ISP_NO_SPLIT, and when the current transform unit is a first transform unit to be parsed in a current coding unit or the prevTuCbfY variable is equal to a value of the third CBF of the luma transform unit (tu_cbf_luma) of a previous luma transform unit in the current coding unit.

Clause 8. The method of clause 7, further comprising deriving a context index (ctxInc) for the luma transform unit (tu_cbf_luma) equal to a first context index of a first context mode of the two context modes, wherein the first context index is derived by prevTuCbfY.

Clause 9. The method of clause 1, wherein utilizing two context modes for coding the third CBF of the luma transform unit (tu_cbf_luma) depends on a trDepth variable, the method further comprising deriving a trDepth variable, wherein when IntraSubpartitionSplitType is not equal to ISP_NO_SPLIT, trDepth is equal to 1, or when a size of the transform unit is smaller than a size of a current coding unit, trDepth is equal to 1, or trDepth is equal to 0; and deriving a context index (ctxInc) for the luma transform unit (tu_cbf_luma) equal to a first context index of a first context mode of the two context modes, wherein the first context index is derived by trDepth.

Clause 10. The method of clause 1, wherein when a current transform unit is equal to or greater than a predefined size, the first context model is selected from a plurality of context models and when the current transform unit is less than a predefined size, another context model is selected from the plurality of context models.

Clause 11. The method of clause 1, wherein when a current transform unit belongs to an inter coded coding unit (CU), the first context model is selected from a plurality of context models and when the current transform unit does not belong to an inter coded CU, another context model is selected from the plurality of context models.

Clause 12. The method of clause 1, wherein utilizing two context modes for coding the third CBF of the luma transform unit (tu_cbf_luma) comprises, when IntraSubpartitionSplitType is equal to ISP_NO_SPLIT, deriving a first context index (ctxInc) for the luma transform unit (tu_cbf_luma), wherein the first ctxInc for the luma transform unit is derived by trDepth; or when IntraSubpartitionSplitType is not equal to ISP_NO_SPLIT, deriving a prevTuCbfY variable, wherein the prevTuCbfY variable is equal to 0 when the current transform unit is a first transform unit to be parsed in a current coding unit, or prevTuCbfY is equal to a value of the third CBF of the luma transform unit (tu_cbf_luma) of a previous luma transform unit in the current coding unit, and deriving the first ctxInc for the luma transform unit, wherein the first ctxInc for the luma transform unit is equal to 2+ the prevTuCbfY variable.

Clause 13. The method of clause 12, further comprising deriving a second context index (ctxInc) for the Cb transform unit (tu_cbf_cb), wherein the second ctxInc for the Ch transform unit is equal to trDepth; and deriving a third context index (ctxInc) for the Cr transform unit (tu_cbf_cr), wherein the third ctxInc for the Cr transform unit is equal to a value of the second CBF of the Ch transform unit (tu_cbf_cb) of a corresponding Cb transform unit in the current coding unit.

Clause 14. A method for coding a coded block flag (CBF) using Context-adaptive binary arithmetic coding (CABAC), the method comprising utilizing a first context model for coding a first CBF of a luma transform unit (tu_cbf_luma); utilizing a second context model for coding a second CBF of a Cb transform unit (tu_cbf_cb); and utilizing two context modes for coding a third CBF of a Cr transform unit, wherein the two context modes are selected based on a value of the second CBF of the Cb transform unit for a current coding unit (CU).

Clause 15. The method of clause 14, further comprising deriving a context index (ctxInc) for the luma transform unit equal to a value of the second CBF of the Cb transform unit (tu_cbf_cb) of a corresponding Cb transform unit in the current coding unit.

Clause 16. A computing device, comprising one or more processors; a non-transitory storage coupled to the one or more processors; and a plurality of programs stored in the non-transitory storage that, when executed by the one or more processors, cause the computing device to perform acts as set forth in clauses 1-15.

Clause 17. A non-transitory computer readable storage medium storing a plurality of programs for execution by a computing device having one or more processors, wherein the plurality of programs, when executed by the one or more processors, cause the computing device to perform acts as set forth in clauses 1-15.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

What is claimed is:

1. A method for video encoding, comprising:
   determining, for a current luma transform block in a current coding unit, whether a first variable indicating an intra subpartition (ISP) split type is equal to ISP_NO_SPLIT;
   in response to determining that the first variable is equal to ISP_NO_SPLIT, determining a luma block flag context index for a luma block flag of the current luma transform block as being equal to zero or one without determining whether the current luma transform block is smaller than the current coding unit, wherein the luma block flag of the current luma transform block specifies whether the current luma transform block comprises one or more transform coefficient levels not equal to zero;
   in response to determining that the first variable is not equal to ISP_NO_SPLIT, determining the luma block flag context index based on whether a current transform unit is a first one to be parsed in the current coding unit; and
   encoding the luma block flag of the current luma transform block based on the luma block flag context index using context-adaptive binary arithmetic coding (CABAC) to form a video bitstream.

2. The method of claim 1, wherein determining the luma block flag context index comprises:
   in response to determining that the current transform unit is the first one to be parsed in the current coding unit, deriving a second variable as being equal to zero; and
   determining the luma block flag context index based on the second variable.

3. The method of claim 1, wherein determining the luma block flag context index comprises:
   in response to determining that the current transform unit is not the first one to be parsed in the current coding unit, deriving a second variable as being equal to a value of a luma block flag of a previous luma transform unit in the current coding unit; and
   determining the luma block flag context index based on the second variable.

4. The method of claim 2, wherein determining the luma block flag context index based on the second variable comprises:
   deriving the luma block flag context index as being equal to the second variable plus two.

5. The method of claim 1, further comprising:
   deriving a Cb block flag context index for a Cb block flag of a Cb transform block in the current coding unit specifying whether the Cb transform block comprises one or more transform coefficient levels not equal to zero; and
   encoding the Cb block flag of the Cb transform block based on the Cb block flag context index using CABAC.

6. The method of claim 5, wherein there exists only one CABAC context available for encoding the Cb block flag of the Cb transform block.

7. The method of claim 1, further comprising:
deriving a Cr block flag context index for a Cr block flag of a Cr transform block in the current coding unit specifying whether the Cr transform block comprises one or more transform coefficient levels not equal to zero; and
encoding the Cr block flag of the Cr transform block based on the Cr block flag context index using CABAC.

8. The method of claim 7, wherein there exist two CABAC contexts, either one of which is indicated by the Cr block flag context index, available for encoding the Cr block flag of the Cr transform block.

9. The method of claim 7, wherein deriving the Cr block flag context index comprises:
deriving the Cr block flag context index as being equal to a value of a Cb block flag of a Cb transform block in the current coding unit, wherein the Cb block flag of the Cb transform block specifies whether the Cb transform block comprises one or more transform coefficient levels not equal to zero.

10. A computing device comprising:
one or more processors;
a non-transitory storage coupled to the one or more processors; and
a plurality of programs stored in the non-transitory storage that, when executed by the one or more processors, cause the computing device to perform acts comprising:
determining, for a current luma transform block in a current coding unit, whether a first variable indicating an intra subpartition (ISP) split type is equal to ISP_NO_SPLIT;
in response to determining that the first variable is equal to ISP_NO_SPLIT, determining a luma block flag context index for a luma block flag of the current luma transform block as being equal to zero or one without determining whether the current luma transform block is smaller than the current coding unit, wherein the luma block flag of the current luma transform block specifies whether the current luma transform block comprises one or more transform coefficient levels not equal to zero;
in response to determining that the first variable is not equal to ISP_NO_SPLIT, determining the luma block flag context index based on whether a current transform unit is a first one to be parsed in the current coding unit; and
encoding the luma block flag of the current luma transform block based on the luma block flag context index using context-adaptive binary arithmetic coding (CABAC) to form a video bitstream.

11. The computing device of claim 10, wherein determining the luma block flag context index comprises:
in response to determining that the current transform unit is the first one to be parsed in the current coding unit, deriving a second variable as being equal to zero; and
determining the luma block flag context index based on the second variable.

12. The computing device of claim 10, wherein determining the luma block flag context index comprises:
in response to determining that the current transform unit is not the first one to be parsed in the current coding unit, deriving a second variable as being equal to a value of a luma block flag of a previous luma transform unit in the current coding unit; and
determining the luma block flag context index based on the second variable.

13. The computing device of claim 11, wherein determining the luma block flag context index based on the second variable comprises:
deriving the luma block flag context index as being equal to the second variable plus two.

14. The computing device of claim 10, wherein the acts further comprise:
deriving a Cb block flag context index for a Cb block flag of a Cb transform block in the current coding unit specifying whether the Cb transform block comprises one or more transform coefficient levels not equal to zero; and
encoding the Cb block flag of the Cb transform block based on the Cb block flag context index using CABAC.

15. The computing device of claim 14, wherein there exists only one CABAC context available for encoding the Cb block flag of the Cb transform block.

16. The computing device of claim 10, wherein the acts further comprise:
deriving a Cr block flag context index for a Cr block flag of a Cr transform block in the current coding unit specifying whether the Cr transform block comprises one or more transform coefficient levels not equal to zero; and
encoding the Cr block flag of the Cr transform block based on the Cr block flag context index using CABAC.

17. The computing device of claim 16, wherein there exist two CABAC contexts, either one of which is indicated by the Cr block flag context index, available for encoding the Cr block flag of the Cr transform block.

18. The computing device of claim 16, wherein deriving the Cr block flag context index comprises:
deriving the Cr block flag context index as being equal to a value of a Cb block flag of a Cb transform block in the current coding unit, wherein the Cb block flag of the Cb transform block specifies whether the Cb transform block comprises one or more transform coefficient levels not equal to zero.

19. A method for storing a bitstream, comprising:
performing an encoding method to generate a bitstream; and
storing the bitstream on a non-transitory computer readable storage medium,
wherein the encoding method comprises:
determining, for a current luma transform block in a current coding unit, whether a first variable indicating an intra subpartition (ISP) split type is equal to ISP_NO_SPLIT;
in response to determining that the first variable is equal to ISP_NO_SPLIT, determining a luma block flag context index for a luma block flag of the current luma transform block as being equal to zero or one without determining whether the current luma transform block is smaller than the current coding unit, wherein the luma block flag of the current luma transform block specifies whether the current luma transform block comprises one or more transform coefficient levels not equal to zero;
in response to determining that the first variable is not equal to ISP_NO_SPLIT, determining the luma block flag context index based on whether a current transform unit is a first one to be parsed in the current coding unit; and encoding the luma block flag of the current luma transform block based on the luma block flag context index using context-adaptive binary arithmetic coding (CABAC) to form the bitstream.

20. The method of claim 19, wherein determining the luma block flag context index comprises:
in response to determining that the current transform unit is the first one to be parsed in the current coding unit, deriving a second variable as being equal to zero; and
determining the luma block flag context index based on the second variable.

\* \* \* \* \*